US012112694B2

(12) United States Patent
Jeong et al.

(10) Patent No.: US 12,112,694 B2
(45) Date of Patent: Oct. 8, 2024

(54) PIXEL AND DISPLAY DEVICE

(71) Applicant: Samsung Display Co., Ltd., Yongin-Si (KR)

(72) Inventors: Minjae Jeong, Hwaseong-si (KR); Jangmi Kang, Seoul (KR); Hyeongseok Kim, Hwaseong-si (KR); Junhyun Park, Suwon-si (KR); Mukyung Jeon, Ulsan (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/374,070

(22) Filed: Sep. 28, 2023

(65) Prior Publication Data

US 2024/0029641 A1 Jan. 25, 2024

Related U.S. Application Data

(63) Continuation of application No. 17/970,623, filed on Oct. 21, 2022, now Pat. No. 11,862,072.

(30) Foreign Application Priority Data

Feb. 17, 2022 (KR) ........................ 10-2022-0021073

(51) Int. Cl.
*G09G 3/32* (2016.01)

(52) U.S. Cl.
CPC ....... *G09G 3/32* (2013.01); *G09G 2300/0426* (2013.01); *G09G 2300/043* (2013.01); *G09G 2300/0819* (2013.01); *G09G 2300/0842* (2013.01); *G09G 2300/0852* (2013.01); *G09G 2300/0861* (2013.01); *G09G 2310/0251* (2013.01); *G09G 2310/0262* (2013.01); *G09G 2310/08* (2013.01); *G09G 2320/0233* (2013.01); *G09G 2320/045* (2013.01)

(58) Field of Classification Search
None
See application file for complete search history.

(56) References Cited

U.S. PATENT DOCUMENTS 7,414,599 B2 8/2008 Chung et al.
7,834,557 B2 11/2010 Kim
9,159,263 B2 * 10/2015 Choi .................... G09G 3/3225
9,159,266 B2 10/2015 Kim (Continued)

FOREIGN PATENT DOCUMENTS

KR 10-0560780 B1 3/2006
KR 10-2045546 B1 12/2019
KR 10-2021-0013460 A 2/2021

*Primary Examiner* — Dorothy Harris
(74) *Attorney, Agent, or Firm* — Innovation Counsel LLP

(57) ABSTRACT

A pixel includes a light emitting element, a first transistor including a first electrode electrically connected to a first voltage line which supplies a first driving voltage, a second electrode electrically connected to the light emitting element, and a gate electrode connected to a first node, a second transistor connected between the first node and a second node and including a gate electrode connected to a first scan line, a third transistor connected between the second electrode of the first transistor and the second node and including a gate electrode connected to a second scan line, and a booting capacitor connected between the second node and the second scan line.

18 Claims, 14 Drawing Sheets

(56) References Cited

U.S. PATENT DOCUMENTS

| | | | | |
|---|---|---|---|---|
| 11,195,893 | B2 | 12/2021 | Lee et al. | |
| 2005/0264493 | A1 | 12/2005 | Shin | |
| 2009/0201231 | A1 | 8/2009 | Takahara et al. | |
| 2010/0149140 | A1* | 6/2010 | Nakamura | G09G 3/3233 345/204 |
| 2014/0098078 | A1 | 4/2014 | Jeon et al. | |
| 2019/0295469 | A1 | 9/2019 | Umezawa et al. | |
| 2019/0362673 | A1 | 11/2019 | Ueda | |
| 2020/0226978 | A1 | 7/2020 | Lin et al. | |
| 2020/0294451 | A1* | 9/2020 | Kim | G09G 3/3291 |
| 2021/0097930 | A1* | 4/2021 | An | G09G 3/32 |
| 2021/0118368 | A1* | 4/2021 | In | G09G 3/3275 |
| 2021/0158760 | A1* | 5/2021 | Jang | G09G 3/3266 |
| 2021/0174737 | A1* | 6/2021 | Park | G09G 3/20 |
| 2023/0316976 | A1* | 10/2023 | Zhou | G09G 3/20 345/212 |

* cited by examiner

PIXEL AND DISPLAY DEVICE

CROSS-REFERENCE TO RELATED APPLICATIONS

This application is a continuation application of U.S. patent application Ser. No. 17/970,623 filed on Oct. 21, 2022, which claims priority under 35 U.S.C. § 119 to Korean Patent Application No. 10-2022-0021073 filed on Feb. 17, 2022, in the Korean Intellectual Property Office, the disclosures of which are incorporated by reference herein in their entireties.

BACKGROUND

Embodiments of the present disclosure described herein relate to a display device.

Electronic devices, which provide images to a user, such as a smart phone, a digital camera, a notebook computer, a navigation system, a monitor, and a smart television include a display device for displaying the images. The display device generates an image and provides the user with the generated image through a display screen.

The display device includes a plurality of pixels and driving circuits for controlling the plurality of pixels. Each of the plurality of pixels includes a light emitting element and a pixel circuit for controlling the light emitting element. The driving circuit of a pixel may include a plurality of transistors organically connected to one another.

The display device may apply a data signal to a display panel and may display a predetermined image as a current corresponding to the data signal is supplied to the light emitting element.

SUMMARY

Embodiments of the present disclosure provide a pixel and a display device capable of operating at various driving frequencies.

According to an embodiment, a pixel includes a light emitting element, a first transistor including a first electrode electrically connected to a first voltage line which supplies a first driving voltage, a second electrode electrically connected to the light emitting element, and a gate electrode connected to a first node, a second transistor connected between the first node and a second node and including a gate electrode connected to a first scan line, a third transistor connected between the second electrode of the first transistor and the second node and including a gate electrode connected to a second scan line, and a booting capacitor connected between the second node and the second scan line.

In an embodiment, each of the first transistor and the third transistor may be a P-type transistor and the second transistor may be an N-type transistor.

In an embodiment, the pixel may further include a fourth transistor connected between a data line and the first electrode of the first transistor, and including a gate electrode connected to a third scan line, a fifth transistor connected between the first electrode of the first transistor and a third node, and including a gate electrode connected to the first scan line, and a first capacitor connected between the first node and the third node.

In an embodiment, each of the first transistor, the third transistor, and the fourth transistor may be a P-type transistor, and each of the second transistor and the fifth transistor may be an N-type transistor.

In an embodiment, the pixel may further include a sixth transistor connected between a first initialization voltage line and the second node, and including a gate electrode connected to a fourth scan line, a seventh transistor connected between the light emitting element and a second initialization voltage line, and including a gate electrode connected to the fourth scan line, an eighth transistor connected between the first voltage line and the first electrode of the first transistor, and including a gate electrode connected to a first emission control line, a ninth transistor connected between the second electrode of the first transistor and the light emitting element, and including a gate electrode a second emission control line, and a second capacitor connected between the third node and the first voltage line.

In an embodiment, a first initialization voltage received through the first initialization voltage line after the second transistor and the sixth transistor are turned on during an initialization period may be delivered to the first gate electrode of the first transistor. The seventh transistor may be turned on during the initialization period such that the second initialization voltage line is electrically connected to an anode of the light emitting element.

In an embodiment, the first transistor, the second transistor, the third transistor, the fifth transistor, and the eighth transistor may be turned on during a compensation period such that a threshold voltage of the first transistor and the first driving voltage are provided to the first node and the third node, respectively.

In an embodiment, the initialization period and the compensation period may be repeated alternately between adjacent emission periods.

In an embodiment, a signal received through the data line during a data write period may be delivered to the third node through the fourth transistor and the fifth transistor. The data write period may not overlap the initialization period and the compensation period.

In an embodiment, a first frame includes a first cycle and a second cycle. A scan signal provided to the third scan line may have an active level during the data write period of the first cycle. The scan signal provided to the third scan line may be maintained at an inactive level during a bias period of the second cycle.

In an embodiment, each of a first frame and a second frame may include a first cycle and a second cycle. A scan signal provided to the third scan line may have an active level during the data write period of the first cycle of the first frame and a bias period of the first cycle of the second frame. The scan signal provided to the third scan line may be maintained at an inactive level during the second cycle of the first frame and the second cycle of the second frame.

In an embodiment, a signal provided to the data line during the data write period may be a data signal. A signal provided to the data line during the bias period may be a bias signal.

In an embodiment, a scan signal provided to the first scan line may be maintained at an inactive level during the second cycle of the first frame, the first cycle of the second frame, and the second cycle of the second frame.

According to an embodiment, a display device includes a display panel including a pixel, a driving controller which receives a control signal and an input image signal, and outputs an output image signal, a first control signal, and a second control signal, a data driving circuit for outputting a data signal to the pixel in response to the output image signal and the first control signal, and a scan driving circuit for outputting at least one scan signal to the pixel in response to the second control signal. The pixel includes a light emitting element, a first transistor including a first electrode electrically connected to a first voltage line which supplies a first driving voltage, a second electrode electrically connected to the light emitting element, and a gate electrode connected to a first node, a second transistor connected between the first node and a second node and including a gate electrode connected to a first scan line, a third transistor connected between the second electrode of the first transistor and the second node and including a gate electrode connected to a second scan line, and a booting capacitor connected between the second node and the second scan line.

In an embodiment, each of the first transistor and the third transistor may be a P-type transistor, and the second transistor may be an N-type transistor.

In an embodiment, the pixel may further include a fourth transistor connected between a data line and the first electrode of the first transistor and including a gate electrode connected to a third scan line, a fifth transistor connected between the first electrode of the first transistor and a third node and including a gate electrode connected to the first scan line, and a first capacitor connected between the first node and the third node.

In an embodiment, the pixel may further include a sixth transistor connected between a first initialization voltage line and the second node, and including a gate electrode connected to a fourth scan line, a seventh transistor connected between the light emitting element and a second initialization voltage line, and including a gate electrode connected to the fourth scan line, an eighth transistor connected between the first voltage line and the first electrode of the first transistor, and including a gate electrode connected to a first emission control line, a ninth transistor connected between the second electrode of the first transistor and the light emitting element, and including a gate electrode connected to a second emission control line, and a second capacitor connected between the third node and the first voltage line.

In an embodiment, a first initialization voltage received through the first initialization voltage line after the second transistor and the sixth transistor are turned on during an initialization period may be delivered to the first gate electrode of the first transistor. The seventh transistor may be turned on during the initialization period such that the second initialization voltage line is electrically connected to an anode of the light emitting element.

In an embodiment, the first transistor, the second transistor, the third transistor, the fifth transistor, and the eighth transistor may be turned on during a compensation period such that a threshold voltage of the first transistor and the first driving voltage are provided to the first node and the third node, respectively.

In an embodiment, the initialization period and the compensation period may be repeated alternately between adjacent emission periods.

In an embodiment, a signal received through the data line during a data write period may be delivered to the third node through the fourth transistor and the fifth transistor.

In an embodiment, a first frame may include a first cycle and a second cycle. A scan signal provided to the third scan line may have an active level during the data write period of the first cycle. The scan signal provided to the third scan line may have the active level during a bias period of the second cycle.

In an embodiment, each of a first frame and a second frame may include a first cycle and a second cycle. A scan signal provided to the third scan line may have an active level during the data write period of the first cycle and a bias period of the first cycle of the second frame. The scan signal provided to the third scan line may be maintained at an inactive level during a second cycle of the first frame and a second cycle of the second frame.

According to an embodiment, a pixel includes a light emitting element, a first transistor including a first electrode electrically connected to a first voltage line which supplies a first driving voltage, a second electrode electrically connected to the light emitting element, and a gate electrode connected to a first node, a second transistor connected between a data line and the first electrode of the first transistor and including a gate electrode connected to a first scan line, a third transistor connected between the second electrode of the first transistor and the first node and including a gate electrode connected to a second scan line, a fourth transistor connected between the first node and an initialization voltage line and including a gate electrode connected to a third scan line, a fifth transistor connected between the first electrode of the first transistor and a second node and including a gate electrode connected to a fourth scan line, and a capacitor connected between the first node and the second node. Each of the first transistor and the second transistor may be a P-type transistor, and each of the third to fifth transistors may be an N-type transistor.

In an embodiment, each of a first frame and a second frame may include a first cycle and a second cycle. A scan signal provided to the first scan line may have an active level during a data write period of the first cycle and a bias period of the first cycle of the second frame. The scan signal provided to the first scan line may be maintained at an inactive level during the second cycle of the first frame and the second cycle of the second frame.

In an embodiment, a scan signal provided to the fourth scan line may be maintained at an inactive level during the second cycle of the first frame, the first cycle of the second frame, and the second cycle of the second frame.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
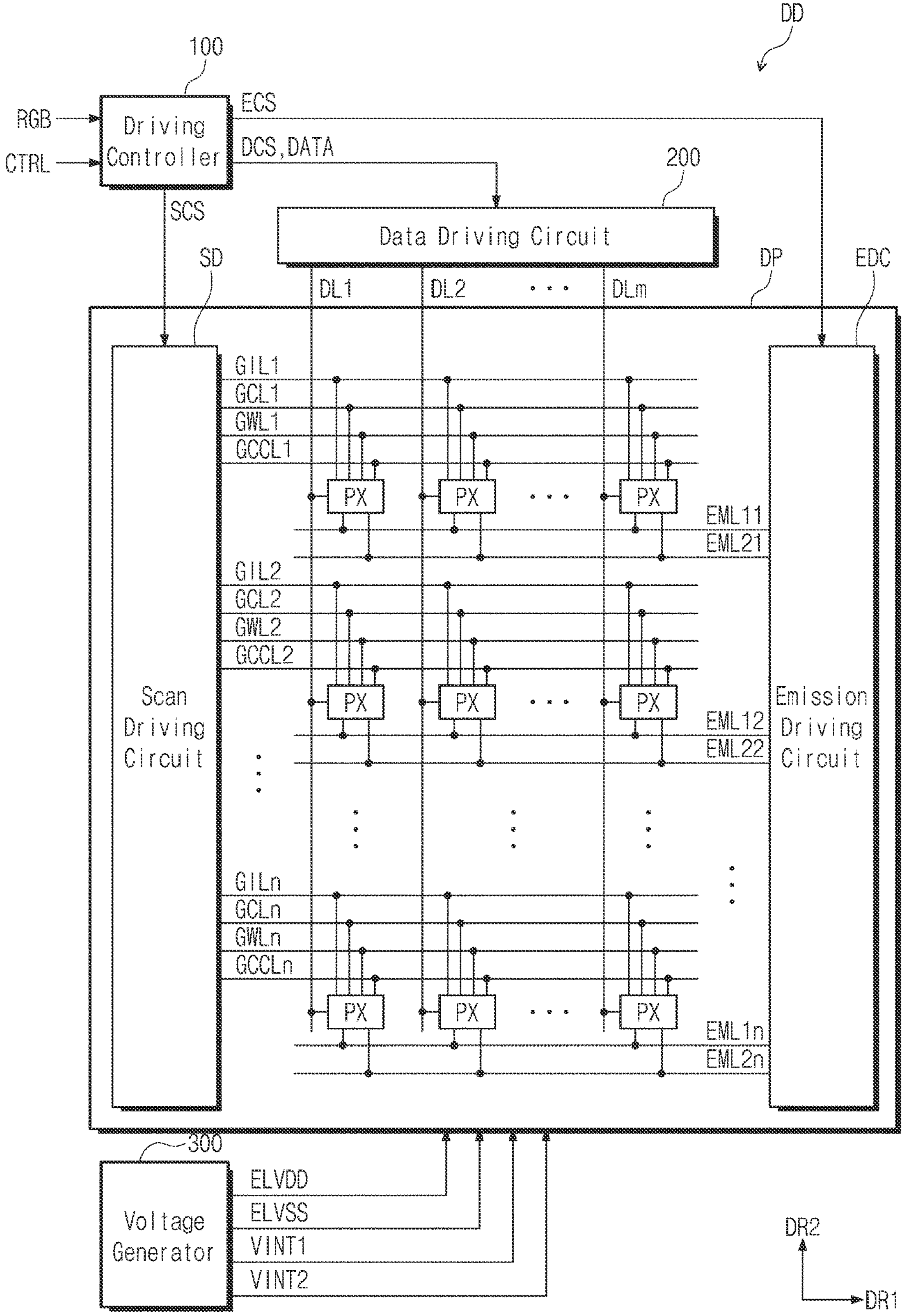
FIG. 1 is a block diagram of a display device according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device according to an embodiment of the present disclosure.

Referring to FIG. 1, a display device DD includes a display panel DP, a driving controller 100, a data driving circuit 200, and a voltage generator 300.

The driving controller 100 receives an input image signal RGB and a control signal CTRL. The driving controller 100 generates an output image signal DATA by converting a data format of the input image signal RGB so as to be suitable for the interface specification of the data driving circuit 200. The driving controller 100 outputs a scan control signal SCS, a data control signal DCS, and an emission driving control signal ECS.

The data driving circuit 200 receives the data control signal DCS and the output image signal DATA from the driving controller 100. The data driving circuit 200 converts the output image signal DATA into data signals and then outputs the data signals to a plurality of data lines DL1 to DLm to be described later. The data signals refer to analog voltages corresponding to a grayscale value of the output image signal DATA.

In an embodiment, the data driving circuit 200 may output one of a data signal corresponding to the output image signal DATA and a bias signal corresponding to a predetermined voltage level to data lines DL1 to DLm.

The voltage generator 300 generates voltages necessary to operate the display panel DP. In an embodiment, the voltage generator 300 generates a first driving voltage ELVDD (or a first voltage), a second driving voltage ELVSS (or a second voltage), a first initialization voltage VINT1 (or a third voltage), and a second initialization voltage VINT2 (or a fourth voltage). In an embodiment, the first initialization voltage VINT1 and the second initialization voltage VINT2 may have voltage levels different from each other. In an embodiment, the first initialization voltage VINT1 may have the same voltage level as the second initialization voltage VINT2.

The display panel DP includes scan lines GIL1 to GILn, GCL1 to GCLn, GWL1 to GWLn, and GCCL1 to GCCLn, emission control lines EML11 to EMLln and EML21 to EML2*n*, and the data lines DL1 to DLm, and pixels PX. The display panel DP may further include a scan driving circuit SD and an emission driving circuit EDC. In an embodiment, the scan driving circuit SD may be arranged on a first side of the display panel DP. The scan lines GIL1 to GILn, GCL1 to GCLn, GWL1 to GWLn, and GCCL1 to GCCLn extend from the scan driving circuit SD in a first direction DR1.

The emission driving circuit EDC is arranged on a second side of the display panel DP. The emission control lines EML11 to EMLln and EML21 to EML2*n* extend from the emission driving circuit EDC in a direction opposite to the first direction DR1.

The scan lines GIL1 to GILn, GCL1 to GCLn, GWL1 to GWLn, and GCCL1 to GCCLn and the emission control lines EML11 to EMLln and EML21 to EML2*n* are arranged spaced from one another in a second direction DR2. The data lines DL1 to DLm extend from the data driving circuit 200 in a direction opposite to the second direction DR2, and are arranged to be spaced from one another in the first direction DR1.

In the example shown in FIG. 1, the scan driving circuit SD and the emission driving circuit EDC are arranged to face each other with the pixels PX interposed therebetween, but the present disclosure is not limited thereto. For example, the scan driving circuit SD and the emission driving circuit EDC may be positioned adjacent to each other on one of the first side and the second side of the display panel DP. In an embodiment, the scan driving circuit SD and the emission driving circuit EDC may be implemented with one circuit.

The plurality of pixels PX are electrically connected to the scan lines GIL1 to GILn, GCL1 to GCLn, GWL1 to GWLn, and GCCL1 to GCCLn, the emission control lines EML11 to EMLln and EML21 to EML2*n*, and the data lines DL1 to DLm. Each of the plurality of pixels PX may be electrically connected to four scan lines and two emission control lines. For example, as shown in FIG. 1, a first row of pixels may be connected to the scan lines GILL GCL1, GWL1, and GCCL1 and the emission control lines EML11 and EML21. Also, a second row of pixels may be connected to the scan lines GIL2, GIL2, GWL2, and GCCL2 and the emission control lines EML12 and EML22.

Each of the plurality of pixels PX includes a light emitting element ED (see FIG. 2) and a pixel circuit for controlling the emission of the light emitting element ED. The pixel circuit may include one or more transistors and one or more capacitors. The scan driving circuit SD and the emission driving circuit EDC may include transistors formed through the same process as transistors of the pixel circuit.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. The scan driving circuit SD may output scan signals to the scan lines GIL1 to GILn, GCL1 to GCLn, GWL1 to GWLn, and GCCL1 to GCCLn in response to the scan control signal SCS.

The emission driving circuit EDC may output emission control signals to emission control lines EML11 to EMLln and EML21 to EML2*n* in response to the emission driving control signal ECS from the driving controller 100.

The driving controller 100 according to an embodiment of the present disclosure may determine an operating frequency and may control the data driving circuit 200, the scan driving circuit SD, and the emission driving circuit EDC depending on the determined operating frequency.

Figure 2:
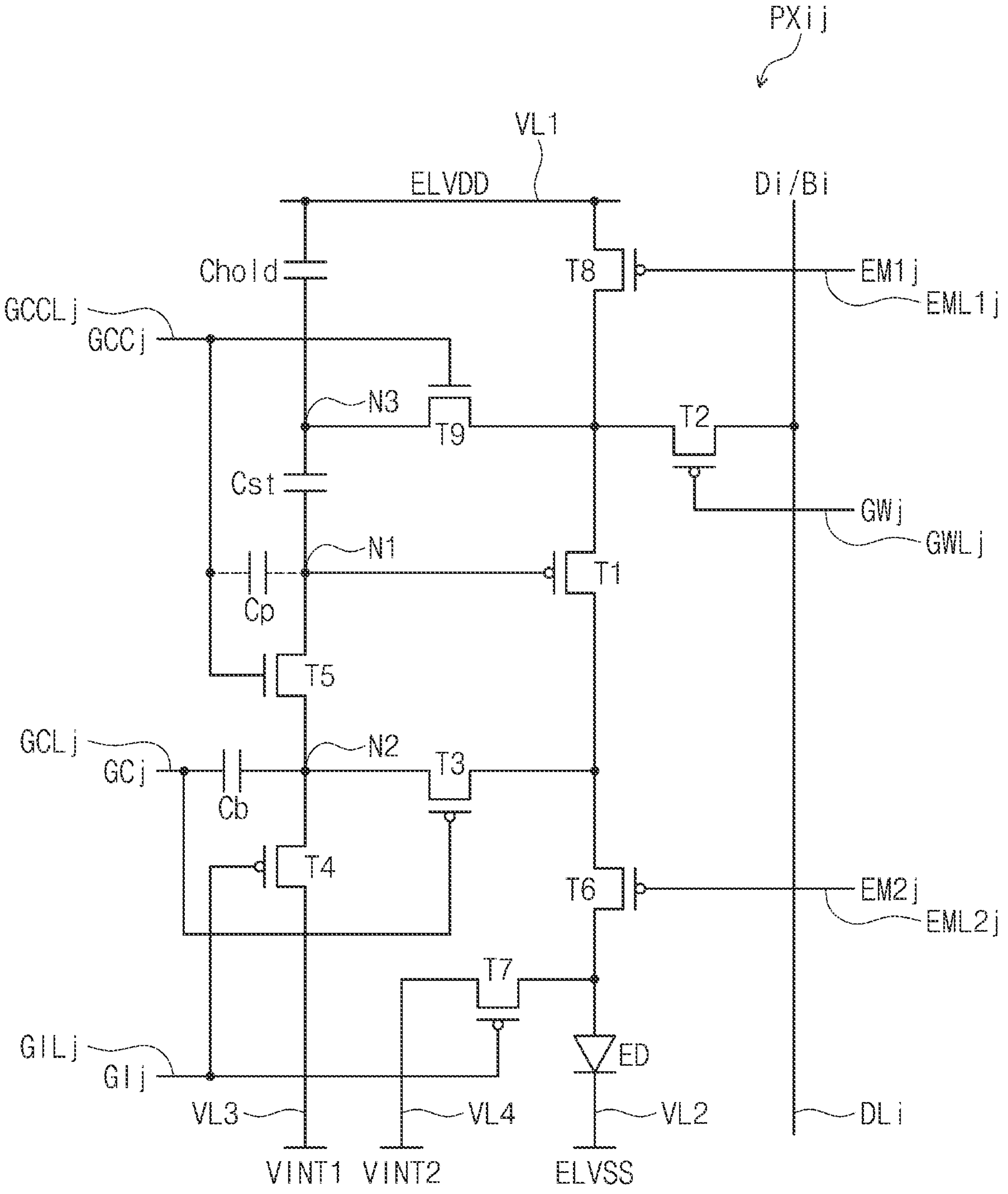
FIG. 2 is an equivalent circuit diagram of a pixel, according to an embodiment of the present disclosure.

FIG. 2 is a circuit diagram of a pixel, according to an embodiment of the present disclosure.

FIG. 2 illustrates an equivalent circuit diagram of a pixel PXij connected to the i-th data line DLi among the data lines DL1 to DLm, the j-th scan lines GILj, GCLj, GWLj, and GCCLj among the scan lines GIL1 to GILn, GCL1 to GCLn, GWL1 to GWLn, and GCCL1 to GCCLn and the j-th emission control lines EML1*j* and EML2*j* among the emission control lines EML11 to EMLln and EML21 to EML2*n*, which are illustrated in FIG. 1.

Each of the plurality of pixels PX shown in FIG. 1 may have the same circuit configuration as the equivalent circuit diagram of the pixel PXij shown in FIG. 2.

Referring to FIG. 2, a pixel PXij of a display device according to an embodiment includes at least one light emitting element ED and a pixel circuit. The pixel circuit may include first to ninth transistors T1, T2, T3, T4, T5, T6, T7, T8, and T9 and first to third capacitors Cst, Chold, and Cb. In an embodiment, the light emitting element ED may be a light emitting diode or a nano emitting diode.

In an embodiment, some of the first to ninth transistors T1 to T9 are P-type transistors having LTPS as a semiconductor layer. The other(s) thereof may be an N-type transistor having an oxide semiconductor as a semiconductor layer.

In an embodiment, each of the first to fourth and sixth to eighth transistors T1 to T4 and T6 to T8 is a P-type transistor, and the fifth transistor T5 and the ninth transistor T9 are N-type transistors.

Moreover, a circuit configuration of the pixel PXij according to an embodiment of the present disclosure is not limited to an embodiment in FIG. 2. The pixel PXij illustrated in FIG. 2 is only an example, and the circuit configuration of the pixel PXij may be altered as required.

The scan lines GILj, GCLj, GWLj, and GCCLj may transmit the scan signals GIj, GCj, GWj, and GCCj, respectively. The emission control lines EML1*j* and EML2*j* may transmit the emission control signals EM1*j* and EM2*j*, respectively. The data line DLi transmits one of the data signal Di and a bias signal Bi. The data signal Di may have a voltage level corresponding to the input image signal RGB that is input to the display device DD (see FIG. 1). The first to fourth voltage lines VL1, VL2, VL3, and VL4 may deliver the first driving voltage ELVDD, the second driving voltage ELVSS, the first initialization voltage VINT1, and the second initialization voltage VINT2, respectively. The third voltage line VL3 and the fourth voltage line VL4 may be referred to as a "first initialization voltage line" and a "second initialization voltage line", respectively.

The first transistor T1 includes a first electrode electrically connected to the first voltage line VL1 via the eighth transistor T8, a second electrode electrically connected to an anode of the light emitting element ED via the sixth transistor T6, and a gate electrode connected to the first node N1.

The second transistor T2 includes a first electrode connected to the data line DLi, a second electrode connected to the first electrode of the first transistor T1, and a gate electrode connected to the scan line GWLj. The second transistor T2 may be turned on in response to the scan signal GWj received through the scan line GWLj so as to deliver one of the data signal Di from the data line DLi or the bias signal Bi to the first electrode of the first transistor T1.

The third transistor T3 includes a first electrode connected to the second electrode of the first transistor T1, a second electrode connected to the second node N2, and a gate electrode connected to the scan line GCLj. The third transistor T3 may be turned on in response to the scan signal GCj received through the scan line GCLj so as to electrically connect the second electrode of the first transistor T1 and the second node N2.

The fourth transistor T4 includes a first electrode connected to the second node N2, a second electrode connected to the third voltage line VL3 through which the first initialization voltage VINT1 is delivered, and a gate electrode connected to the scan line GILj. The fourth transistor T4 is turned on in response to the scan signal GIj received through the scan line GILj so as to deliver the first initialization voltage VINT1 to the second node N2. The first initialization voltage VINT1 may be provided to a gate electrode of the first transistor T1 through the fifth transistor T5. The first initialization voltage VINT1 may be a voltage for initializing the gate electrode of the first transistor T1.

The fifth transistor T5 includes a first electrode connected to the first node N1, a second electrode connected to the second node N2, and a gate electrode connected to the scan line GCCLj. The fifth transistor T5 is turned on in response to the scan signal GCCj supplied from the scan line GCCLj so as to electrically connect the second node N2 and the first node N1.

The sixth transistor T6 includes a first electrode connected to the second electrode of the first transistor T1, a second electrode connected to the anode of the light emitting element ED, and a gate electrode connected to the emission control line EML2*j*. The sixth transistor T6 may be turned on in response to the emission control signal EM2*j* received through the emission control line EML2*j* so as to electrically connect the second electrode of the first transistor T1 to the light emitting element ED.

The seventh transistor T7 includes a first electrode connected to the anode of the light emitting element ED, a second electrode connected to the fourth voltage line VL4, and a gate electrode connected to the scan line GILj. The seventh transistor T7 may be turned on in response to the scan signal GIj received through the scan line GILj such that the fourth initialization voltage line VL4 is electrically connected to the anode of the light emitting element ED. Accordingly, when the seventh transistor T7 is turned on, the anode of the light emitting device ED may be initialized to the second initialization voltage VINT2.

The eighth fifth transistor T8 includes a first electrode connected to the first voltage line VL1, a second electrode connected to the first electrode of the first transistor T1, and a gate electrode connected to the emission control line EML1*j*. The eighth transistor T8 is turned on in response to the emission control signal EM1*j* received through the emission control line EML1*j* so as to deliver the first driving voltage ELVDD to the first electrode of the first transistor T1.

The ninth transistor T9 includes a first electrode connected to the first electrode of the first transistor T1, a second electrode connected to a third node N3, and a gate electrode connected to the scan line GCCLj. The ninth transistor T9 is turned on in response to the scan signal GCCj received through the scan line GCCLj so as to electrically connect the first electrode of the first transistor T1 and the third node N3.

The first capacitor Cst is connected between the third node N3 and the first node N1.

The second capacitor Chold is connected between the first voltage line VL1 and the third node N3.

The third capacitor Cb is connected between the second node N2 and the scan line GCLj.

Figure 3:
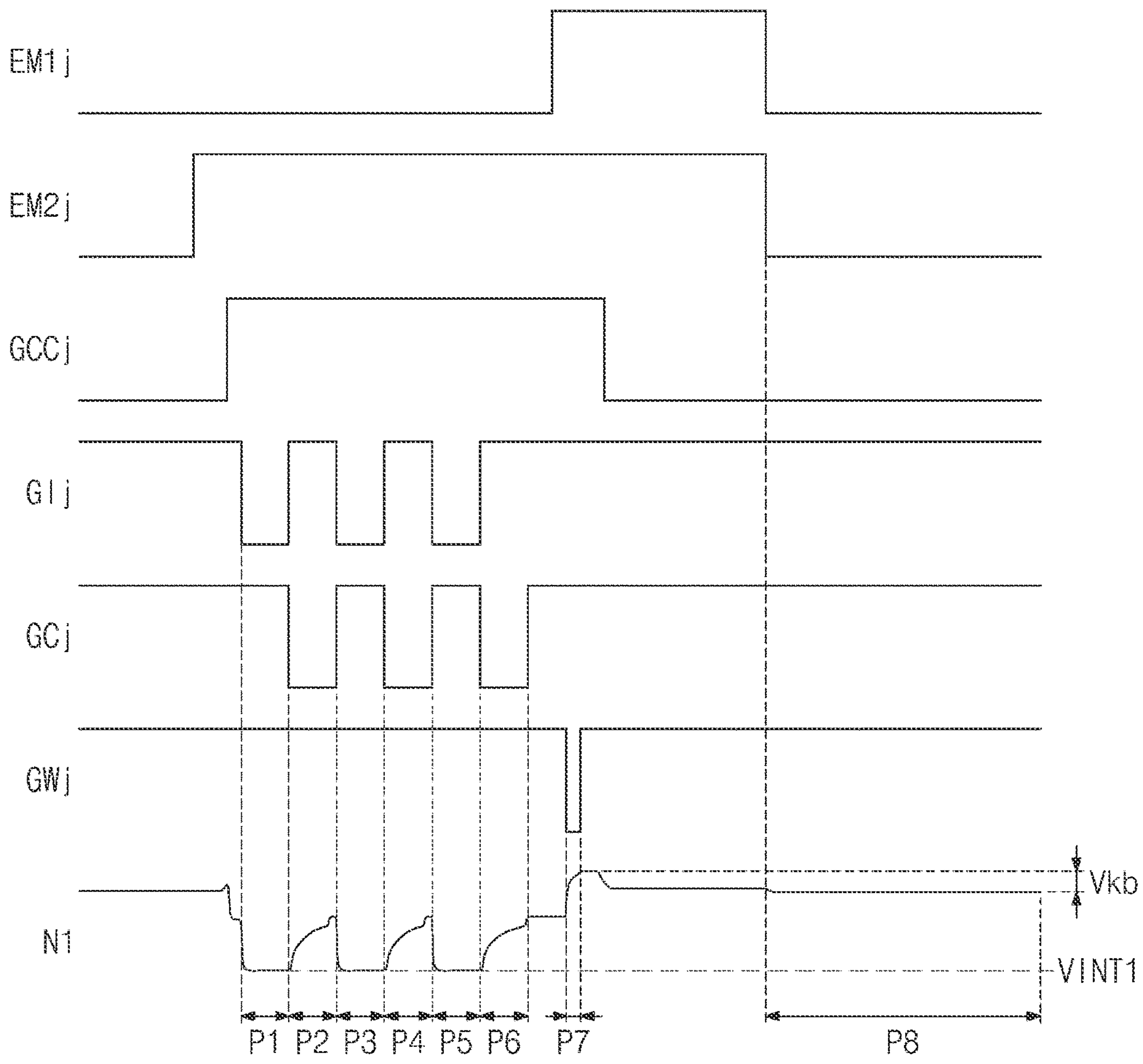
FIG. 3 is a timing diagram of scan signals and emission control signals for describing an operation of the pixel shown in FIG. 2.

FIG. 3 is a timing diagram of scan signals and emission control signals for describing an operation of the pixel shown in FIG. 2.

Referring to FIG. 3, the scan signal GIj provided to the gate electrode of the seventh transistor T7 may be the same as or different from the scan signal GIj provided to the gate electrode of the fourth transistor T4.

In an embodiment, when the scan signal provided to the gate electrode of the fourth transistor T4 is a j-th scan signal GIj, the scan signal provided to the gate electrode of the seventh transistor T7 is a (j+1)-th scan signal GIj+1.

FIGS. 4A to 4D are diagrams for describing an operation of a pixel illustrated in FIG. 2.

Referring to FIGS. 2, 3, and 4A to 4D, first to eighth periods P1 to P8 mean operating states or operating periods of the pixel PXij. When, during the first to sixth periods P1 to P6, the emission control signal EM1*j* is at a low level and the scan signal GCCj is at a high level, the fifth transistor T5, the eighth transistor T8, and the ninth transistor T9 are turned on.

Figure 4A:
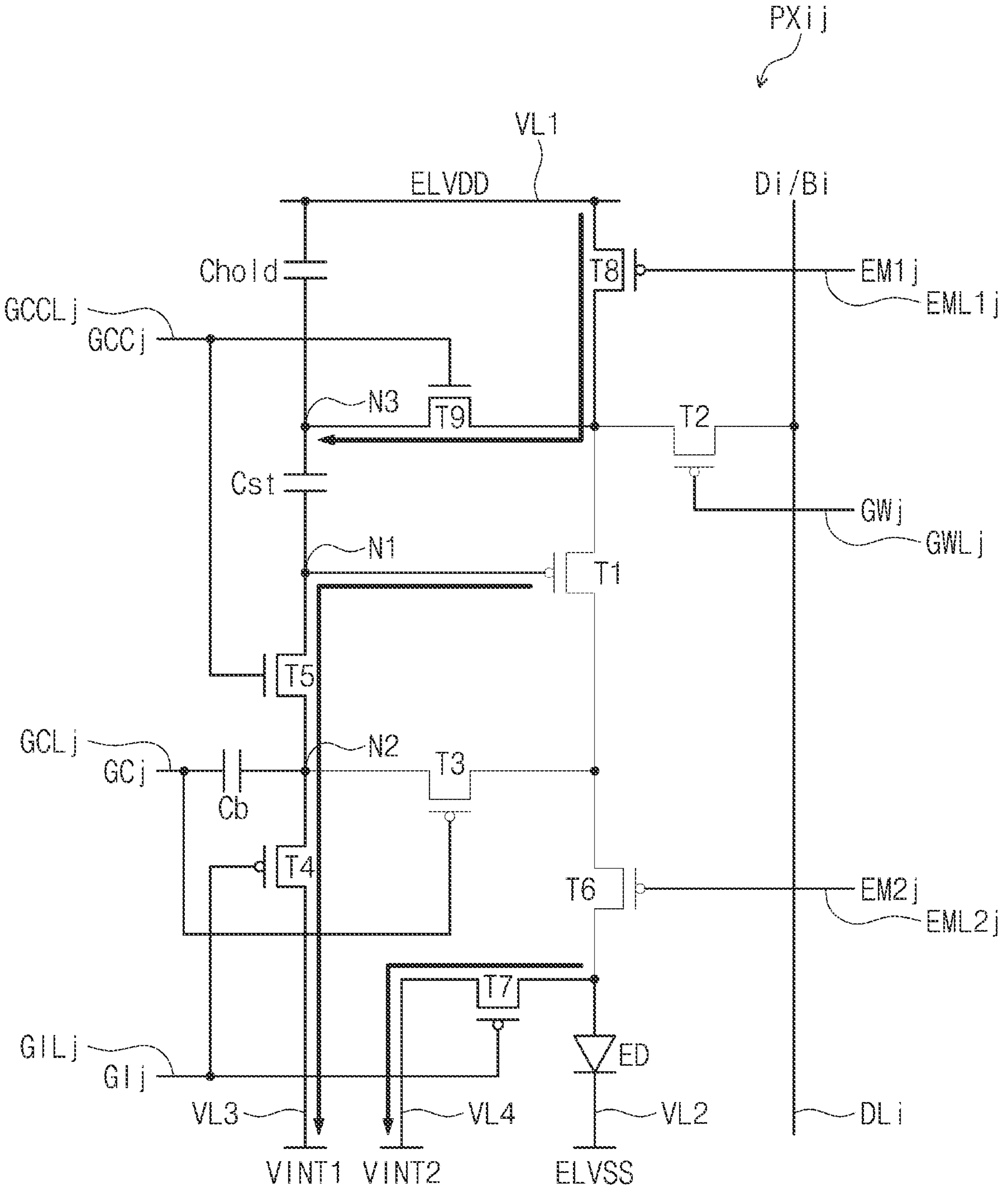
FIGS. 4A, 4B, 4C and 4D are diagrams for describing an operation of a pixel illustrated in FIG. 2.

Referring to FIGS. 2, 3, and 4A, when the scan signal GIj is at a low level in each of the first period P1, third period P3, and the fifth period P5, the fourth transistor T4 and the seventh transistor T7 are turned on. Accordingly, the first initialization voltage VINT1 may be delivered to the first node N1 (i.e., a gate electrode of the first transistor T1) through the fourth transistor T4 and the fifth transistor T5. Moreover, the anode of the light emitting element ED may be initialized to the second initialization voltage VINT2 through the seventh transistor T7.

The first period P1, the third period P3, and the fifth period P5 may be initialization periods for initializing the gate electrode of the first transistor T1 and the anode of the light emitting element ED.

Figure 4B:
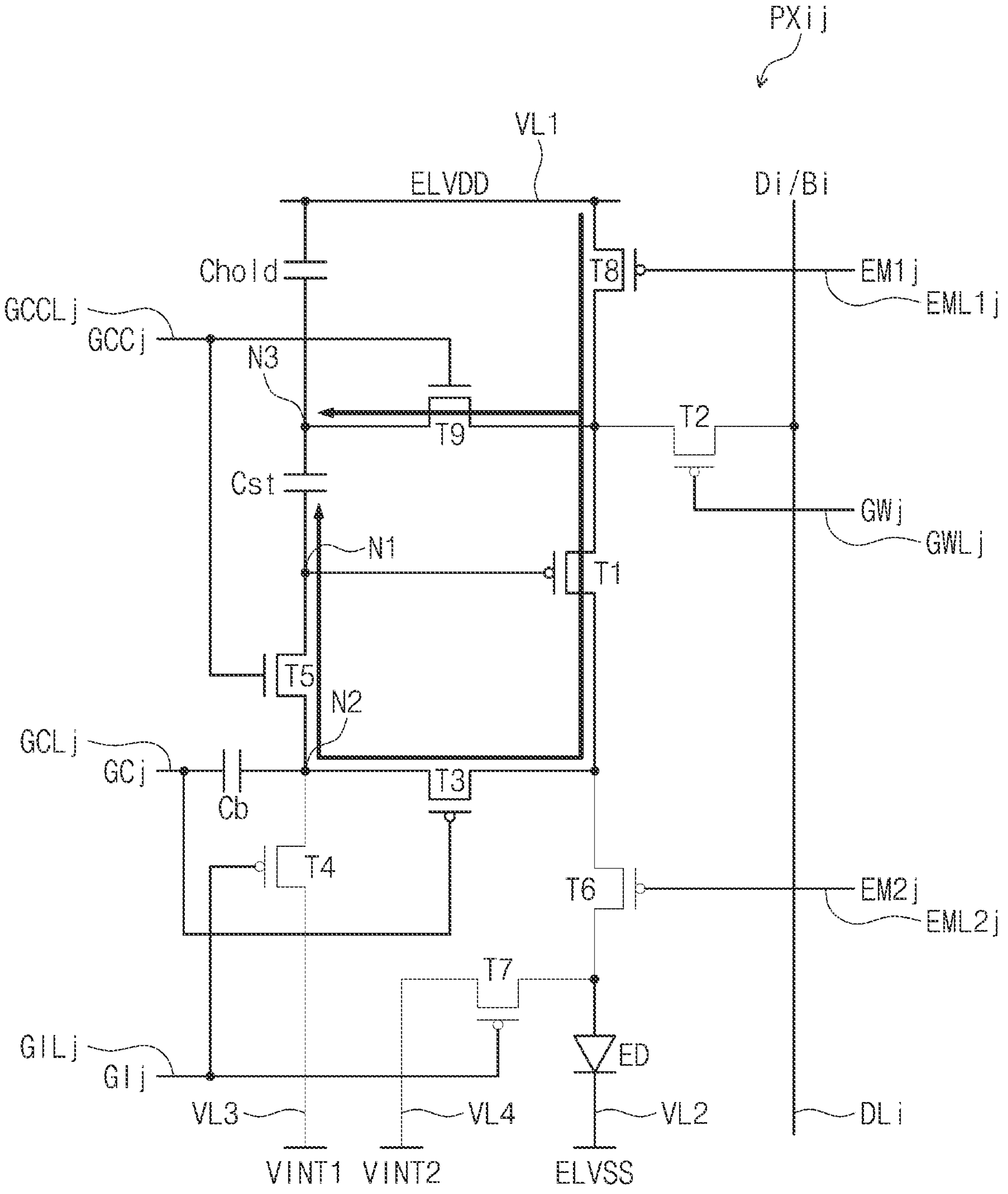

Referring to FIGS. 2, 3, and 4B, when the scan signal GCj is at a low level during each of the second period P2, the fourth period P4, and the sixth period P6, the third transistor T3 is turned on. Accordingly, a voltage obtained by subtracting the first driving voltage ELVDD by a threshold voltage (referred to as "Vth") of the first transistor T1 may be provided to the second node N2, that is, one end of the first capacitor Cst, through the third transistor T3. At this time, because the eighth transistor T8 and the ninth transistor T9 are turned on, the first driving voltage ELVDD is provided to the third node N3, that is, the other end of the first capacitor Cst. Accordingly, a voltage difference between opposite ends of the first capacitor Cst is the same as the threshold voltage Vth of the first transistor T1.

Each of the second period P2, the fourth period P4, and the sixth period P6 may be a compensation period for compensating for the threshold voltage Vth of the first transistor T1.

The pixel PXij that alternately repeats the first period P1, the third period P3, and the fifth period P5 for initializing the gate electrode of the first transistor T1 and the anode of the light emitting element ED, and the second period P2, the fourth period P4, and the sixth period P6 for compensating for the threshold voltage Vth of the first transistor T1 may sufficiently secure initialization and compensation time. Accordingly, the data signal Di in the previous frame may have a minimal effect on the current frame.

FIG. 3 shows that the pixel PXij alternately performs an initialization period and a compensation period three times, but the present disclosure is not limited thereto. The number of times that the initialization period is repeated and the number of times that the compensation period is repeated may be variously changed.

When initialization and compensation operations are completed (i.e., when the sixth period P6 ends), the emission control signal EM1*j* rises to a high level.

Figure 4C:
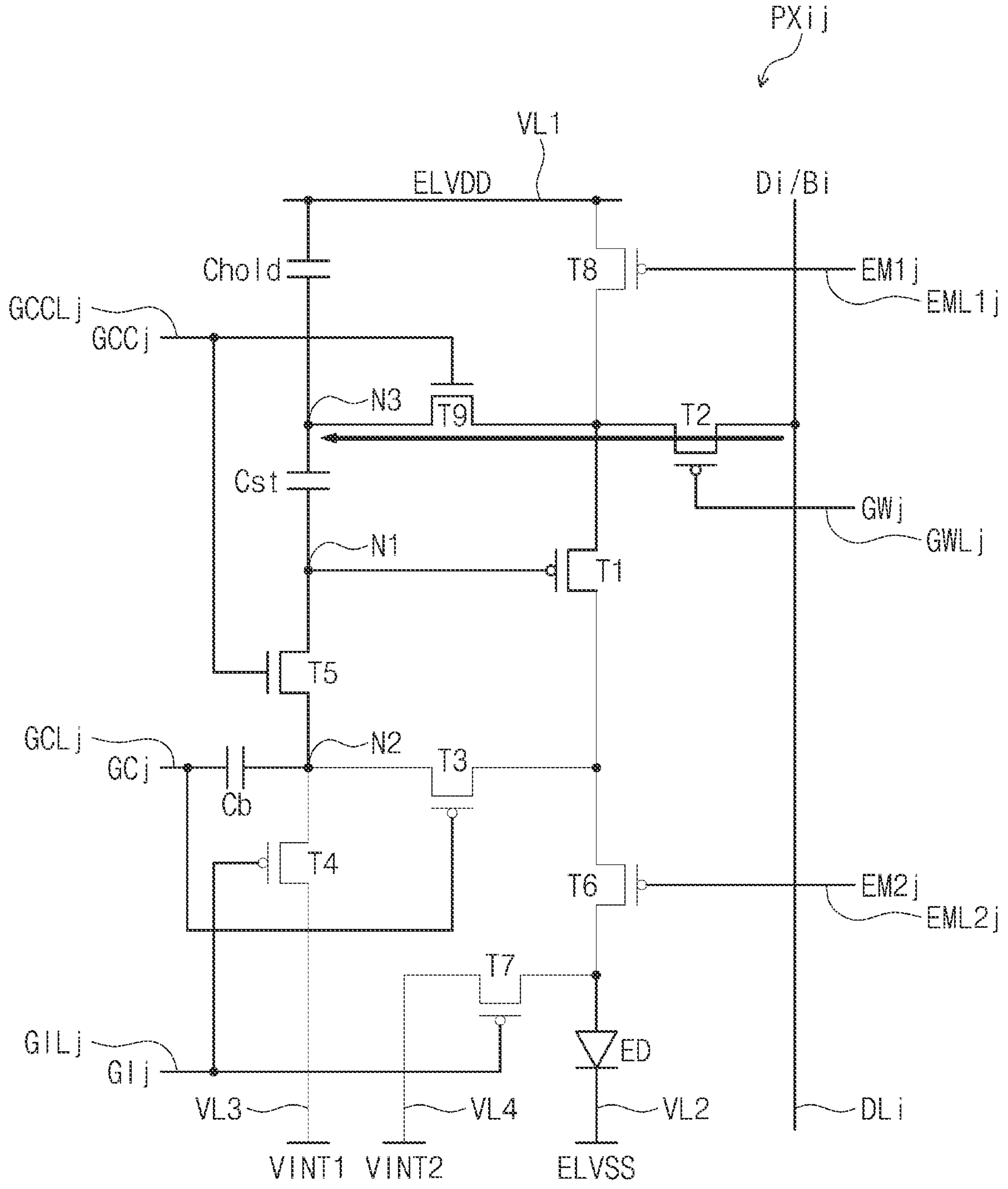

Referring to FIGS. 2, 3, and 4C, when the scan signal GWj falls to a low level during the seventh period P7, the second transistor T2 is turned on. A voltage level (referred to as "Vdata" described below) corresponding to the data signal Di of the data line DLi may be provided to the third node N3 through the second transistor T2 and the eighth transistor T9.

When the voltage level Vdata corresponding to the data signal Di is provided to the third node N3, that is, one end of the first capacitor Cst, the voltage level of the gate electrode of the first transistor T1 changes to "Vdata-Vth".

The seventh period P7 may be a write period for providing the voltage level Vdata corresponding to the data signal Di to one end of the first capacitor Cst.

When the seventh period P7 ends, the scan signal GCCj falls from a high level to a low level. That is, during the first to seventh periods P1 to P7, the scan signal GCCj may be maintained at a high level.

Figure 4D:
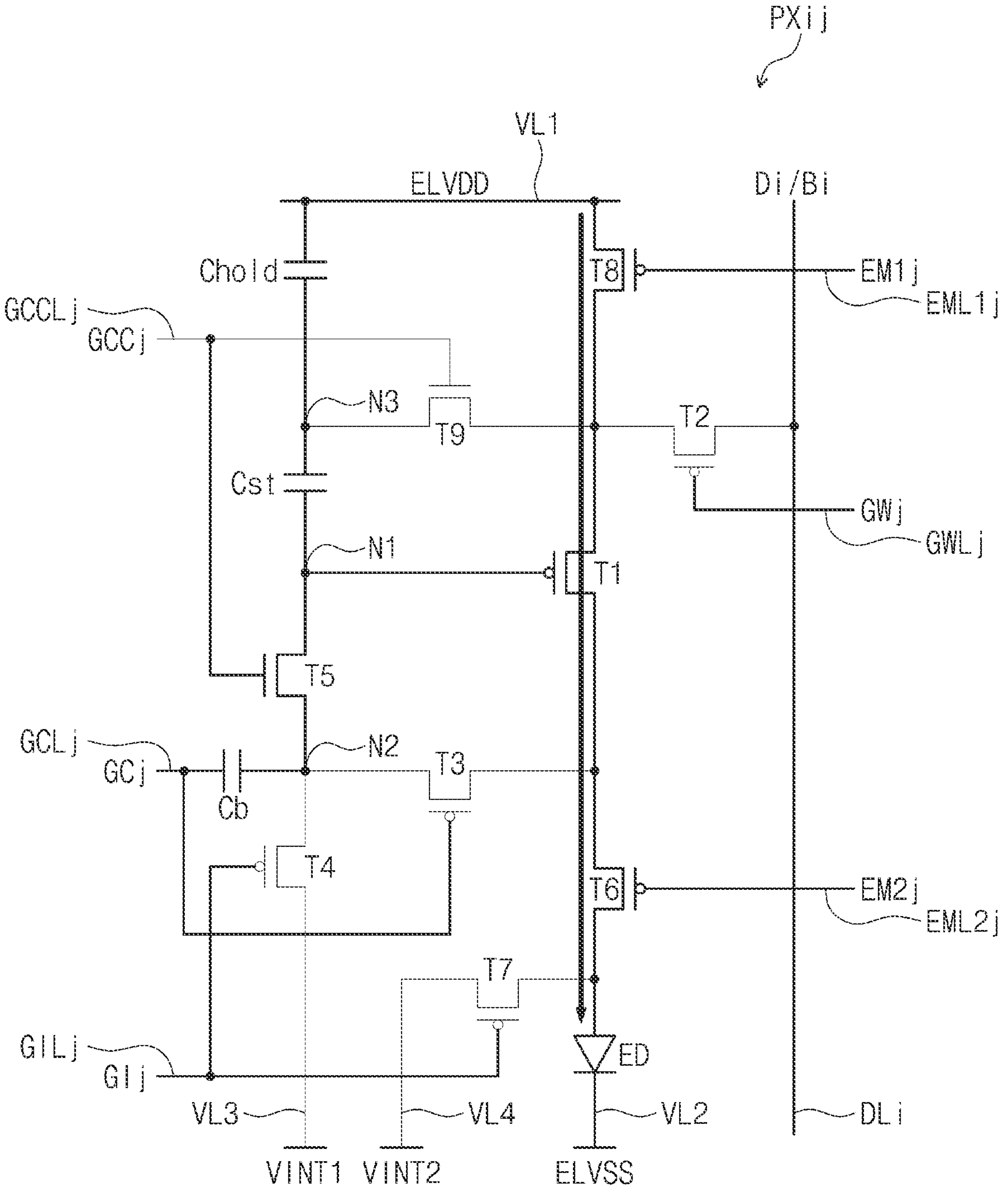

Referring to FIGS. 2, 3, and 4D, when the emission control signals EM1*j* and EM2*j* falls to a low level during the eighth period P8, a current path may be formed from the first voltage line VL1 to the light emitting element ED through the eighth transistor T8, the first transistor T1, and the sixth transistor T6.

A current flowing through the light emitting element ED is proportional to "$(Vgs-Vth)^2$" that is the square of a difference between a gate-source voltage (referred to as "Vgs") of the first transistor T1 and the threshold voltage Vth of the first transistor T1. Because the voltage level of the gate electrode of the first transistor T1 is "Vdata-Vth", the current flowing through the light emitting element ED is proportional to "$(ELVDD-Vdata)^2$" that is the square of a difference between the first driving voltage ELVDD and the voltage level Vdata corresponding to the data signal Di. That is, the threshold voltage Vth of the first transistor T1 may not affect the current flowing through the light emitting element ED. The eighth period P8 may be an emission period of the light emitting element ED.

Because the scan signal GCCj is at a low level during the eighth period P8 that is the emission period, the fifth transistor T5 and the ninth transistor T9 are turned off. In an embodiment, the fifth transistor T5 and the ninth transistor T9 are N-type transistors, and thus a leakage current may be minimized compared to a P-type transistor. Accordingly, a voltage between opposite ends of the first capacitor Cst may be maintained uniformly during the emission period.

Referring to a voltage level change of the first node N1, in the initialization periods such as the first period P1, the third period P3, and the fifth period P5, the voltage level of the first node N1 may correspond to the initialization voltage VINT1. When the scan signal GCj falls to a low level during the second period P2, the fourth period P4, and the sixth period P6, the third transistor T3 is turned on. Accordingly, the gate electrode and the second electrode of the first transistor T1 are electrically connected to each other, and the voltage level of the first node N1 is increased by a difference between the first driving voltage ELVDD and the threshold voltage Vth of the first transistor T1.

That is, during the first to sixth periods P1 to P6, the voltage level of the first node N1 is changed in synchronization with the transition of scan signals GIj and GCj.

When the scan signal GWj falls to a low level in the seventh period P7, the voltage level of the first node N1 is increased by a difference (Vdata-Vth) between the voltage level Vdata of the data signal Di and the threshold voltage Vth of the first transistor T1 and then is lowered by a kickback voltage Vkb when the scan signal GCCj falls from a high level to a low level. This kickback voltage Vkb is generated by a parasitic capacitance Cp between the scan line GCCLj and the gate electrode of the first transistor T1.

The third capacitor Cb is connected between the second node N2 and the scan line GCLj. When the scan signal GCj transmitted through the scan line GCLj rises from a low level to a high level, the voltage of the second node N2 may be boosted. The fifth transistor T5 may be turned on during the first to seventh periods P1 to P7, and thus the voltage of the second node N2 may be delivered to the first node N1. In particular, when the voltage of the first node N1 is maintained at a boosting level and the scan signal GWj falls to a low level at a point in time when the scan signal GCj rises from a low level to a high level at the end of the sixth period P6, the voltage of the first node N1 is increased by the difference (Vdata-Vth) between the voltage level Vdata of the data signal Di and the threshold voltage Vth of the first transistor T1.

Even though the voltage of the first node N1 is lowered by the kickback voltage Vkb when the scan signal GCCj falls from a high level to a low level, the voltage of the first node N1 may be compensated by the boosting voltage by the third capacitor Cb. The third capacitor Cb may be a boosting capacitor.

Figure 5:
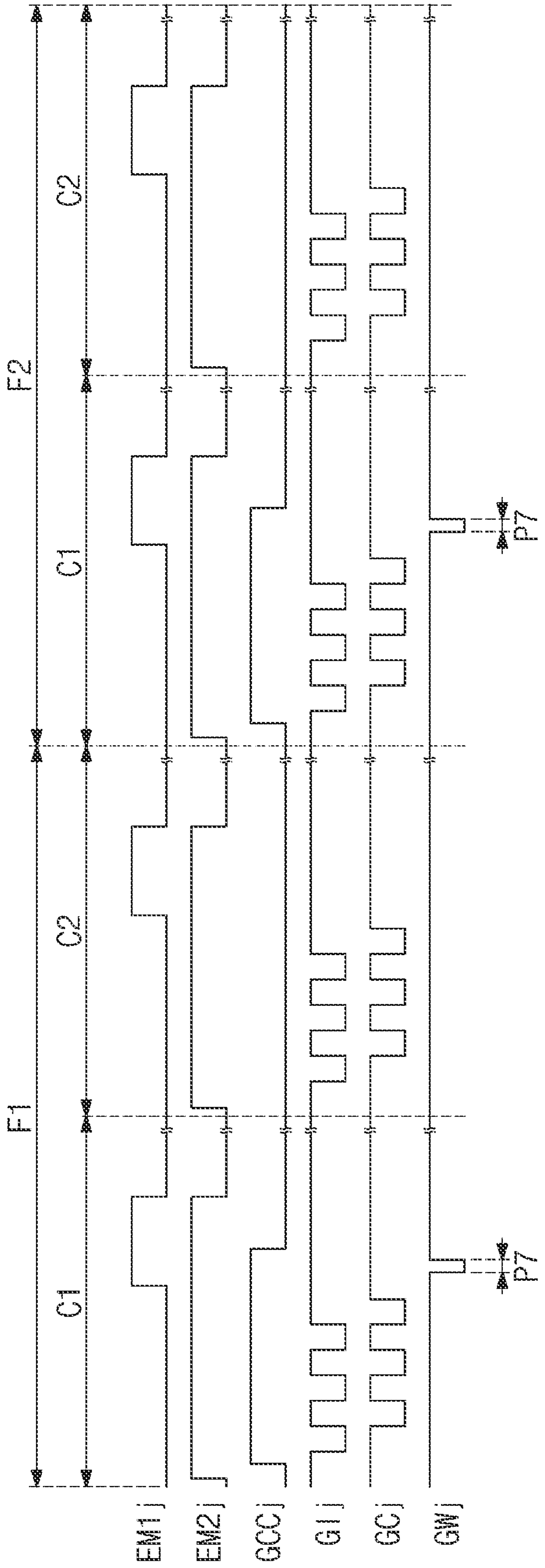
FIG. 5 is a timing diagram of scan signals and emission control signals for describing an operation of the pixel shown in FIG. 2 when an operating frequency is a first operating frequency.

FIG. 5 is a timing diagram of scan signals and emission control signals for describing an operation of the pixel shown in FIG. 2 when an operating frequency is a first operating frequency.

Referring to FIGS. 2 and 5, when an operating frequency is a first operating frequency (e.g., 120 Hz), each of the first frame F1 and the second frame F2 may include a first cycle C1 and a second cycle C2.

When the operating frequency is the first operating frequency, the emission control signals EM1*j* and EM2*j* may fall to an active level (e.g., a low level) during each of the first and second cycles C1 and C2. That is, one frame may include two emission periods. In an embodiment, when the first operating frequency is 120 Hz, each of the emission control signals EM1*j* and EM2*j* may have a frequency of 240 Hz.

When the operating frequency is the first operating frequency, the scan signal GCCj may rise to an active level (e.g., a high level) during the first cycle C1, the scan signals GIj and GCj may fall to an active level (e.g., a low level) multiple times (e.g., 3 times) during each of the first and second cycles C1 and C2.

When the operating frequency is the first operating frequency, the scan signal GWj may fall to an active level (e.g., a low level) during the first cycle C1, and may be maintained at an inactive level (e.g., a high level) during the second cycle C2. That is, the first cycle C1 may be a cycle during which the data signal Di is provided, and the second cycle C2 may be a cycle during which the data signal Di is not provided. When the scan signal GWj is at a low level during the seventh period P7 of the first cycle C1, the second transistor T2 is turned on and the voltage level Vdata corresponding to the data signal Di is stored in the first capacitor Cst. Afterward, in an emission period in which the sixth and eighth transistors T6 and T8 are turned on, a current corresponding to charges stored in the capacitor Cst may be provided to the light emitting element ED.

Because the scan signal GWj is maintained at a high level during the second cycle C2, a new data signal Di is not received. In an emission period when the sixth and eighth transistors T6 and T8 are turned on during the second cycle C2, a current corresponding to charges stored in the capacitor Cst during the first cycle C1 may be provided to the light emitting element ED.

That is, when the operating frequency is the first operating frequency (e.g., 120 Hz), a current corresponding to the data signal Di received during the first cycle C1 may be provided to the light emitting element ED during each of the first cycle C1 and the second cycle C2. Accordingly, when the operating frequency is the first operating frequency (e.g., 120 Hz), a data write operation may be performed during only the first cycle C1. However, light is emitted depending on the same data signal Di during each of the first cycle C1 and the second cycle C2 such that an effect having an operating frequency of 240 Hz is generated.

Figure 6:
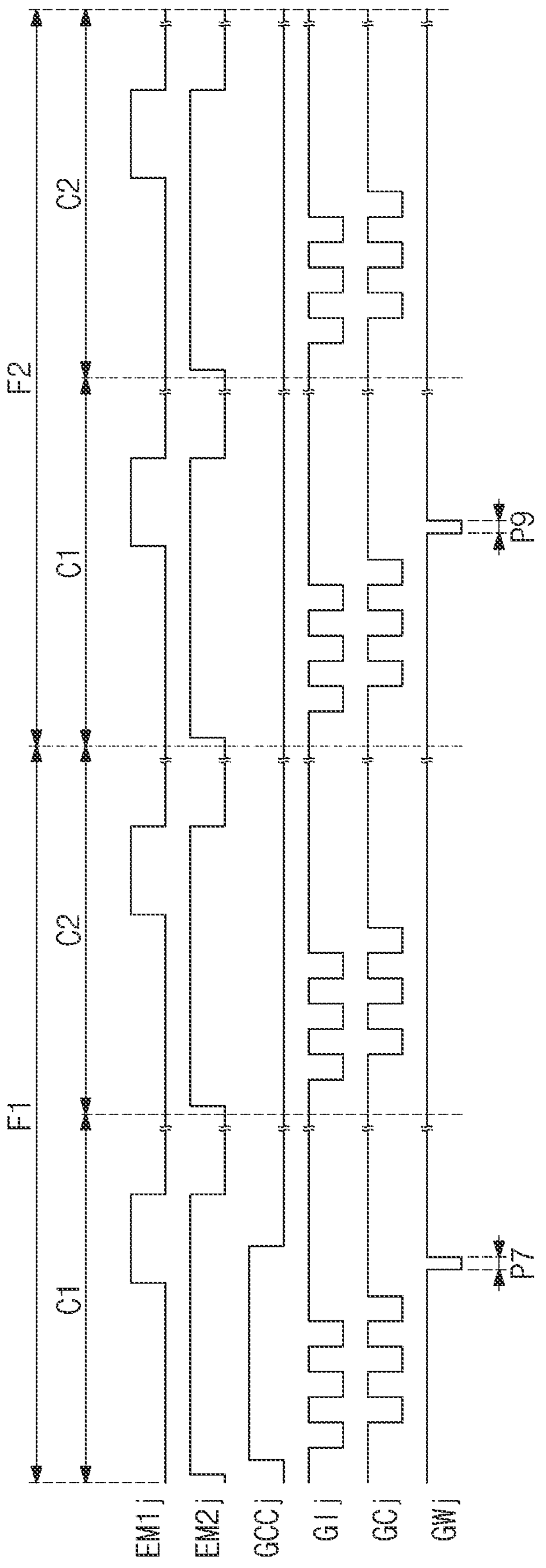
FIG. 6 is a timing diagram of scan signals and emission control signals for describing an operation of the pixel shown in FIG. 2 when an operating frequency is a second operating frequency.

FIG. 6 is a timing diagram of scan signals and emission control signals for describing an operation of the pixel shown in FIG. 2 when an operating frequency is a second operating frequency.

Referring to FIGS. 2 and 6, when an operating frequency is a second operating frequency, each of the first frame F1 and the second frame F2 may include the first cycle C1 and the second cycle C2. When the operating frequency is the second operating frequency, one period may include the first frame F1 and the second frame F2. The second operating frequency may be a lower than the first operating frequency. In an embodiment, the first operating frequency may be 120 Hz, and the second operating frequency may be 60 Hz.

When the operating frequency is the second operating frequency, the emission control signals EM1*j* and EM2*j* may fall to an active level (e.g., a low level) during the first and second cycles C1 and C2 of each of the first frame F1 and the second frame F2. That is, one frame may include two emission periods.

When the operating frequency is the second operating frequency, the scan signal GCCj rise to an active level (e.g., a high level) during the first cycle C1 of the first frame F1 and then is maintained at an inactive level (e.g., a low level) during the second cycle C2 of the first frame F1 and the first and second cycles C1 and C2 of the second frame F2. The scan signals GIj and GCj may fall to an active level (e.g., a low level) during the first and second cycles C1 and C2 of each of the first frame F1 and the second frame F2 multiple times (e.g., 3 times).

When the operating frequency is the second operating frequency, the scan signal GWj may fall to an active level (e.g., a low level) during the first cycle C1 of each of the first frame F1 and the second frame F2, and may be maintained at an inactive level (e.g., a high level) during the second cycle C2 of each of the first frame F1 and the second frame F2.

When the scan signal GWj is at a low level during the seventh period P7 of the first cycle C1 of the first frame F1, the second transistor T2 is turned on and the voltage level Vdata corresponding to the data signal Di is stored in the first capacitor Cst. Afterward, in an emission period in which the sixth and eighth transistors T6 and T8 are turned on, a current corresponding to charges stored in the capacitor Cst may be provided to the light emitting element ED.

Because the scan signal GWj is maintained at a high level during the second cycle C2 of the first frame F1, the second transistor T2 is turned off. During the second cycle C2 of the first frame F1, the scan signal GCCj is at a low level and the emission control signal EM1*j* is at a low level. In this case, the first driving voltage ELVDD is provided to the first electrode of the first transistor T1. That is, the first driving voltage ELVDD may be applied to the first electrode of the first transistor T1 during the second cycle C2 of the first frame F1.

When the scan signal GWj has a low level during the first cycle C1 of the second frame F2, the bias signal Bi provided through the data line DLi may be applied to the first electrode of the first transistor T1. At this time, because the scan signal GCCj is at a low level, the ninth transistor T9 is turned off, and thus the bias signal Bi is not stored in the first capacitor Cst. The ninth period P9, during which the scan signal GWj has a low level during the first cycle C1 of the second frame F2, may be referred to as a “bias period”.

Because the scan signal GWj is maintained at a high level during the second cycle C2 of the second frame F2, the second transistor T2 is turned off. During the second cycle C2 of the second frame F2, the scan signal GCCj is at a low level and the emission control signal EM1*j* is at a low level. In this case, the first driving voltage ELVDD is provided to the first electrode of the first transistor T1. That is, the first driving voltage ELVDD may be applied to the first electrode of the first transistor T1 during the second cycle C2 of the second frame F2. When the operating frequency is the second operating frequency, the first cycle C1 of the first frame F1 may be referred to as an “address scan cycle” during which the valid data signal Di is provided. Each of the second cycle C2 of the first frame F1, the first cycle C1 of the second frame F2, and the second cycle C2 of the second frame F2 may be referred to as a “self-scan cycle” during which the valid data signal Di is not provided.

In an embodiment, the first cycle C1 of the second frame F2 is a cycle during which the bias signal Bi is applied to the first electrode of the first transistor T1. Each of the second cycle C2 of the first frame F1 and the second cycle C2 of the second frame F2 is a cycle during which the first driving voltage ELVDD is applied to the first electrode of the first transistor T1.

The first driving voltage ELVDD and the bias signal Bi may be alternately applied to the first electrode of the first transistor T1. As a voltage applied to the first electrode of the first transistor T1 is periodically changed, a change in luminance due to hysteresis characteristics of the first transistor T1 may be minimized.

Meanwhile, because the scan signal GCCj is maintained at a low level during the second cycle C2 of the first frame F1 and the first and second cycles C1 and C2 of the second frame F2, the fifth transistor T5 is turned off. Accordingly, even when the scan signal GCj is toggled during each of the second cycle C2 of the first frame F1, the first cycle C1 of the second frame F2, and the second cycle C2 of the second frame F2, a voltage level of the first node N1 does not change by the scan signal GCj.

When the operating frequency is the second operating frequency (e.g., 60 Hz), the same scan signal GCCj is maintained at a low level during the second cycle C2 of the first frame F1 and each of the first and second cycles C1 and C2 of the second frame F2, and thus a new data signal Di is not transmitted to the capacitor Cst. Meanwhile, the emission control signals EM1*j* and EM2*j* falls to a low level during the second cycle C2 of the first frame F1 and the first and second cycles C1 and C2 of the second frame F2, and thus the sixth and eighth transistors T6 and T8 may be turned on. In an emission period in which the sixth and eighth transistors T6 and T8 are turned on, a current corresponding to charges stored in the capacitor Cst may be provided to the light emitting element ED. That is, a current corresponding to the data signal Di received during the first cycle C1 of the first frame F1 may be provided to the light emitting element ED during the second cycle C2 of the first frame F1 and the first and second cycles C1 and C2 of the second frame F2.

When the operating frequency is the second operating frequency (e.g., 60 Hz), a data write operation may be performed during only the first cycle C1 of the first frame F1. However, light may be emitted depending on the same data signal Di during the second cycle C2 of the first frame F1 and the first and second cycles C1 and C2 of the second frame F2. Accordingly, the same effect as the operating frequency of 240 Hz may be achieved.

Figure 7:
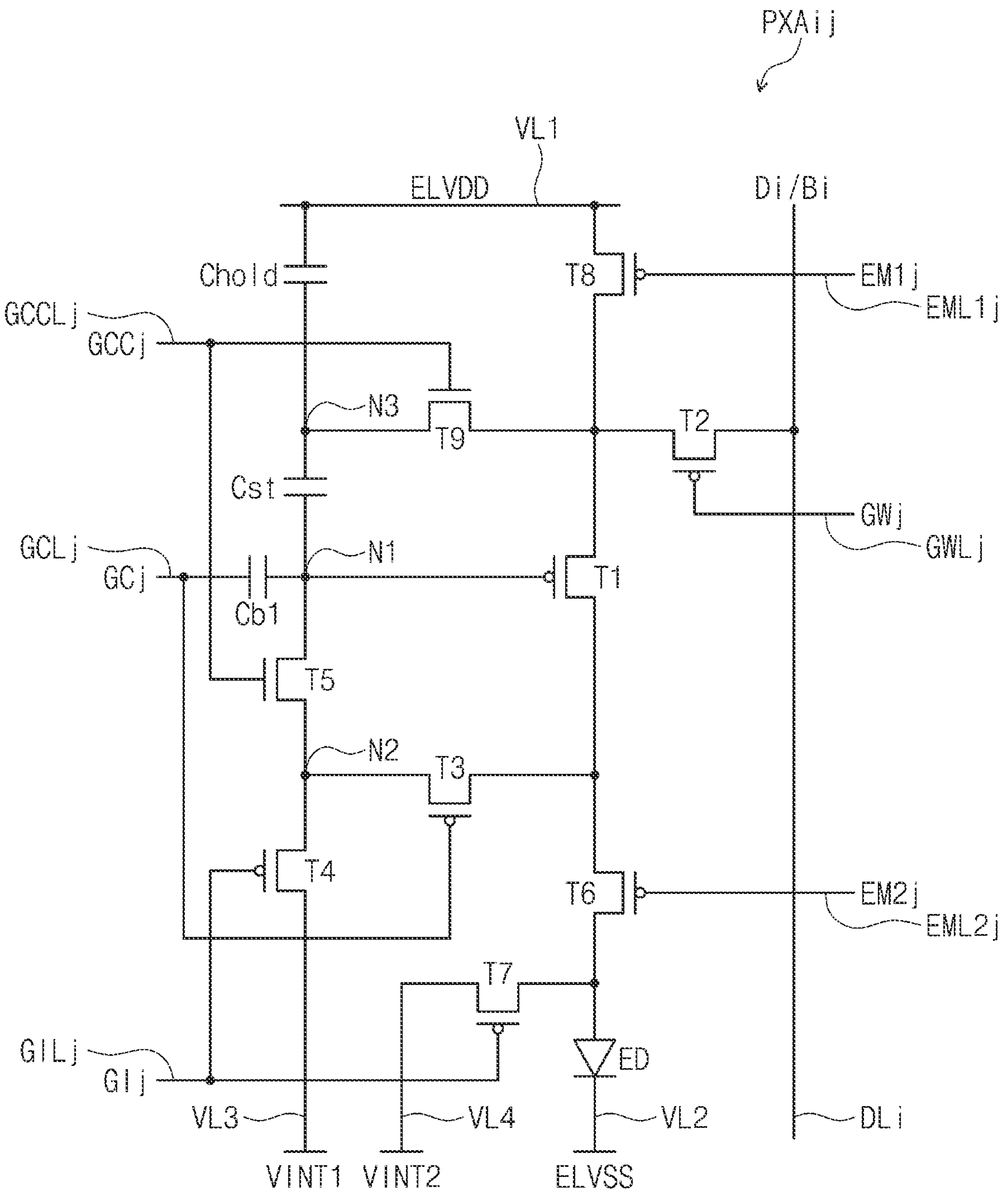
FIG. 7 is an equivalent circuit diagram of a pixel according to an embodiment of the present disclosure.

FIG. 7 is an equivalent circuit diagram of a pixel according to an embodiment of the present disclosure.

A pixel PXAij illustrated in FIG. 7 includes a configuration similar to the pixel PXij shown in FIG. 2, and thus the same reference numerals are used for the same components, and additional descriptions are omitted to avoid redundancy.

Referring to FIG. 7, the pixel PXAij includes a third capacitor Cb1 connected between the first node N1 and the scan line GCLj.

When the scan signal GCj supplied from the scan line GCLj rises from a low level to a high level, the voltage of the first node N1 may be boosted by the third capacitor Cb1. When the voltage of the first node N1 is maintained at a boosting level and then the scan signal GWj falls to a low level at a point in time when the scan signal GCj rises from a low level to a high level at the end of the sixth period P6 as illustrated in FIG. 3, the voltage of the first node N1 is increased by the difference (Vdata-Vth) between the voltage level Vdata of the data signal Di and the threshold voltage Vth of the first transistor T1.

Even though the voltage of the first node N1 is lowered by the kickback voltage Vkb when the scan signal GCCj falls from a high level to a low level, the voltage of the first node N1 may be compensated by the boosting voltage by the third capacitor Cb1. The third capacitor Cb1 may be a boosting capacitor.

Figure 8:
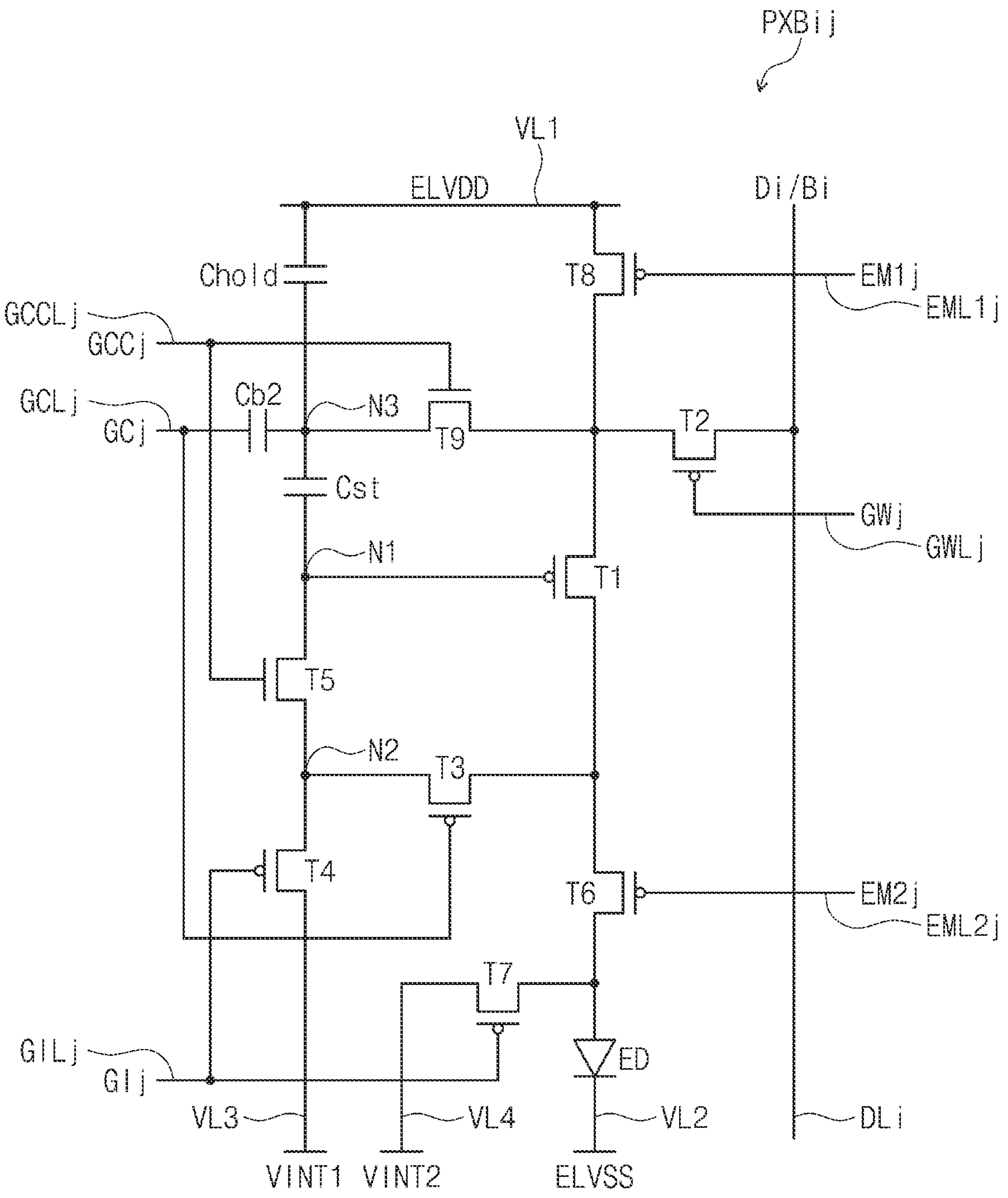
FIG. 8 is an equivalent circuit diagram of a pixel, according to an embodiment of the present disclosure.

FIG. 8 is an equivalent circuit diagram of a pixel, according to an embodiment of the present disclosure.

A pixel PXBij illustrated in FIG. 8 includes a configuration similar to the pixel PXij shown in FIG. 2, and thus the same reference numerals are used for the same components, and additional descriptions are omitted to avoid redundancy.

Referring to FIG. 8, the pixel PXBij includes a third capacitor Cb2 connected between the third node N3 and the scan line GCLj.

When the scan signal GCj supplied from the scan line GCLj rises from a low level to a high level, the voltage of the third node N3 may be boosted by the third capacitor Cb2. When the voltage of the third node N3 is maintained at a boosting level and then the scan signal GWj falls to a low level at a point in time when the scan signal GCj rises from a low level to a high level at the end of the sixth period P6 as illustrated in FIG. 3, the voltage of the third node N3 is increased by the voltage level Vdata of the data signal Di.

Even though the voltage of the first node N1 is lowered by the kickback voltage Vkb when the scan signal GCCj falls from a high level to a low level, the voltage of the first node N1 may be compensated by the boosting voltage by the third capacitor Cb2. The third capacitor Cb2 may be a boosting capacitor.

Figure 9:
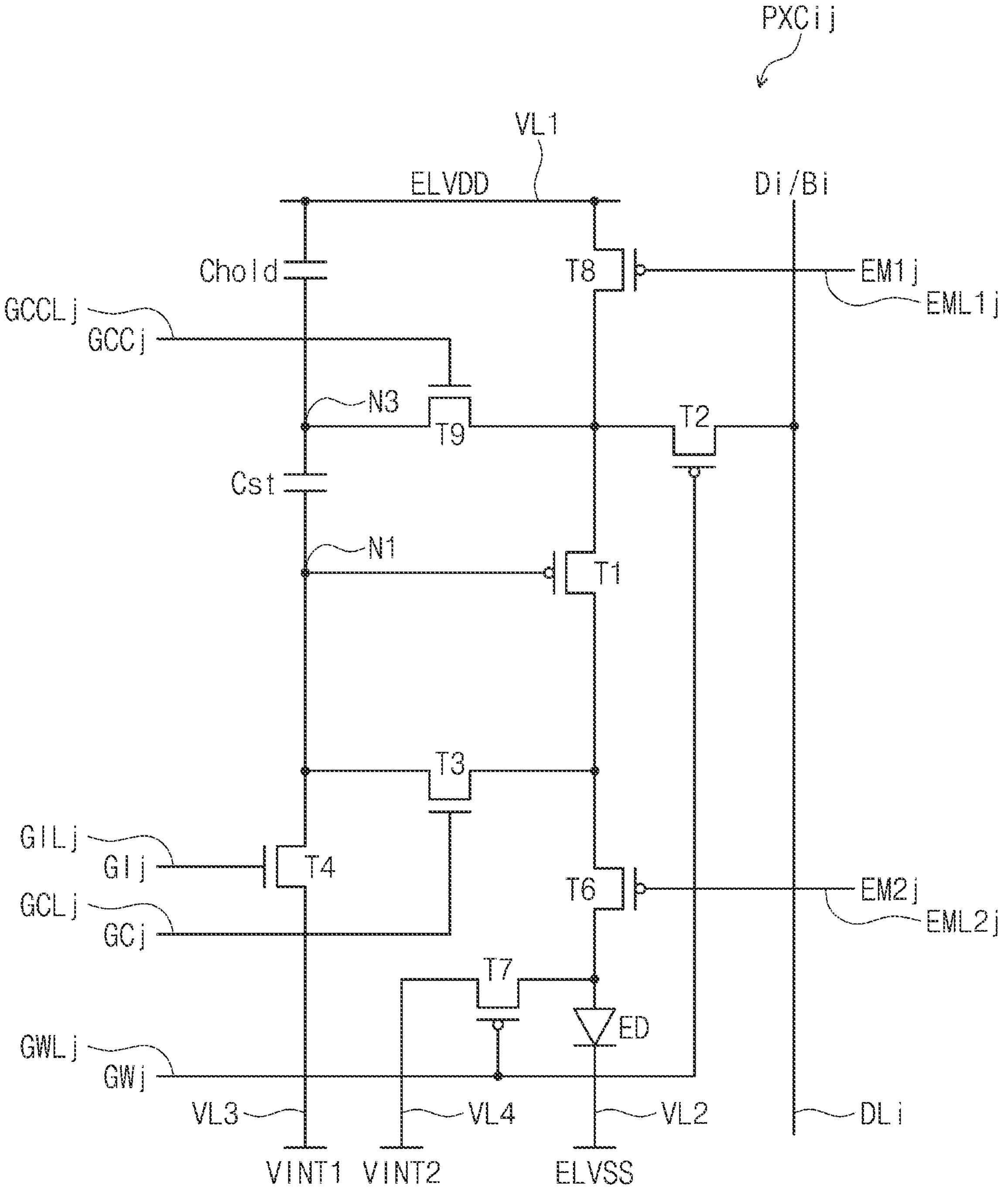
FIG. 9 is a circuit diagram of a pixel, according to an embodiment of the present disclosure.

FIG. 9 is a circuit diagram of a pixel, according to an embodiment of the present disclosure.

FIG. 9 illustrates an equivalent circuit diagram of a pixel PXij connected to the i-th data line DLi among the data lines DL1 to DLm, the j-th scan lines GILj, GCLj, GWLj, and GCCLj among the scan lines GIL1 to GILn, GCL1 to GCLn, GWL1 to GWLn, and GCCL1 to GCCLn and the j-th emission control lines EML1*j* and EML2*j* among the emission control lines EML11 to EMLln and EML21 to EML2*n*, which are illustrated in FIG. 1.

Each of the plurality of pixels PX shown in FIG. 1 may have the same circuit configuration as the equivalent circuit diagram of the pixel PXCij shown in FIG. 9.

Referring to FIG. 9, the pixel PXCij of a display device according to an embodiment includes at least one light emitting element ED and a pixel circuit. The pixel circuit may include first to fourth and sixth to ninth transistors T1 to T4 and T6 to T9, and first and second capacitors Cst and Chold. In an embodiment, the light emitting element ED may be a light emitting diode.

In an embodiment, the pixel PXCij shown in FIG. 9 does not include the fifth transistor T5 and the third capacitor Cb of the pixel PXij shown in FIG. 2.

In an embodiment, some of the first to fourth and sixth to ninth transistors T1 to T4 and T6 to T9 are P-type transistors having LTPS as a semiconductor layer. The other(s) thereof may be an N-type transistor having an oxide semiconductor as a semiconductor layer.

In an embodiment, each of the first, second, and sixth to eighth transistors T1, T2, and T6 to T8 is a P-type transistor, and each of the third, fourth, and ninth transistors T3, T4, and T9 is an N-type transistor.

The scan lines GILj, GCLj, GWLj, and GCCLj may deliver the scan signals GIj, GCj, GWj, and GCCj, respectively. The emission control lines EML1*j* and EML2*j* may deliver the emission control signals EM1*j* and EM2*j*, respectively. The data line DLi transmits one of the data signal Di and the bias signal Bi. The data signal Di may have a voltage level corresponding to the input image signal RGB that is input to the display device DD (see FIG. 1). The first to fourth voltage lines VL1, VL2, VL3, and VL4 may deliver the first driving voltage ELVDD, the second driving voltage ELVSS, the first initialization voltage VINT1, and the second initialization voltage VINT2, respectively. The third voltage line VL3 and the fourth voltage line VL4 may be referred to as a "first initialization voltage line" and a "second initialization voltage line", respectively.

The first transistor T1 includes a first electrode electrically connected to the first voltage line VL1 via the eighth transistor T8, a second electrode electrically connected to an anode of the light emitting element ED via the sixth transistor T6, and a gate electrode connected to the first node N1.

The second transistor T2 includes a first electrode connected to the data line DLi, a second electrode connected to the first electrode of the first transistor T1, and a gate electrode connected to the scan line GWLj.

The third transistor T3 includes a first electrode connected to the second electrode of the first transistor T1, a second electrode connected to the first node N1, and a gate electrode connected to the scan line GCLj.

The fourth transistor T4 includes a first electrode connected to the first node N1, a second electrode connected to the third voltage line VL3, through which the first initialization voltage VINT1 is delivered, and a gate electrode connected to the scan line GILj.

The sixth transistor T6 includes a first electrode connected to the second electrode of the first transistor T1, a second electrode connected to the anode of the light emitting element ED, and a gate electrode connected to the emission control line EML2*j*.

The seventh transistor T7 includes a first electrode connected to the anode of the light emitting element ED, a second electrode connected to the fourth voltage line VL4, and a gate electrode connected to the scan line GWLj.

The eighth transistor T8 includes a first electrode connected to the first voltage line VL1, a second electrode connected to the first electrode of the first transistor T1, and a gate electrode connected to the emission control line EML1*j*. The eighth transistor T8 is turned on in response to the emission control signal EM1*j* received through the emission control line EML1*j* so as to deliver the first driving voltage ELVDD to the first electrode of the first transistor T1.

The ninth transistor T9 includes a first electrode connected to the first electrode of the first transistor T1, a second electrode connected to a third node N3, and a gate electrode connected to the scan line GCCLj.

The first capacitor Cst is connected between the third node N3 and the first node N1.

The second capacitor Chold is connected between the first voltage line VL1 and the third node N3.

Figure 10:
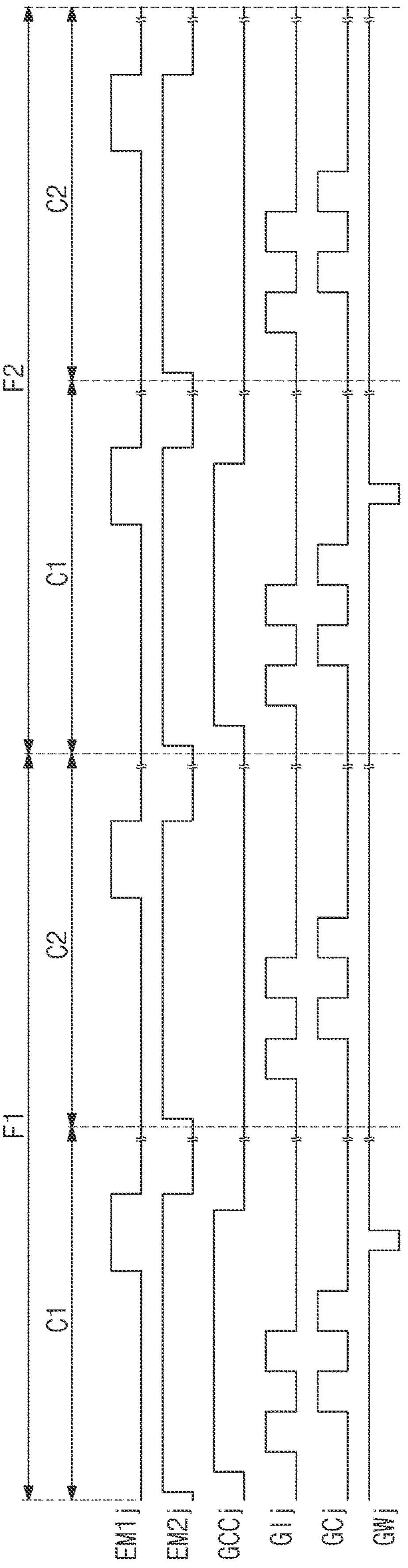
FIG. 10 is a timing diagram of scan signals and emission control signals for describing an operation of the pixel shown in FIG. 9 when an operating frequency is a first operating frequency.
Figure 11:
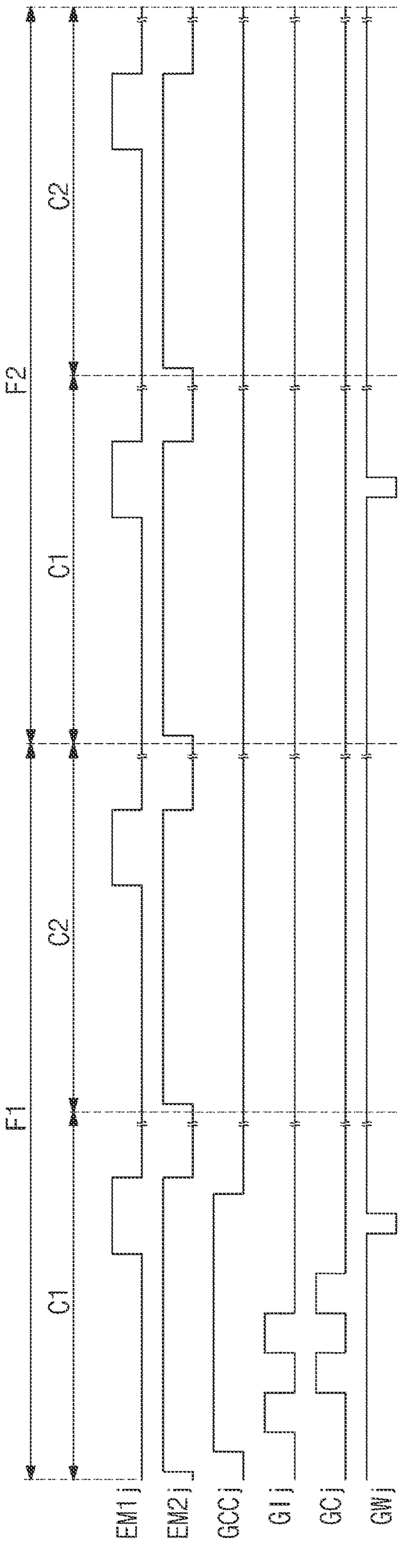
FIG. 11 is a timing diagram of scan signals and emission control signals for describing an operation of the pixel shown in FIG. 9 when an operating frequency is a first operating frequency.

FIGS. 10 and 11 are timing diagrams of scan signals and emission control signals for describing an operation of the pixel shown in FIG. 9.

FIG. 10 is a timing diagram of scan signals and emission control signals for describing an operation of the pixel shown in FIG. 9 when an operating frequency is a first operating frequency.

Referring to FIGS. 9 and 10, when an operating frequency is a first operating frequency (e.g., 120 Hz), each of the first frame F1 and the second frame F2 may include a first cycle C1 and a second cycle C2.

When the operating frequency is the first operating frequency, the emission control signals EMU and EM2*j* may fall to an active level (e.g., a low level) during each of the first and second cycles C1 and C2. That is, one frame may include two emission periods. In an embodiment, when the first operating frequency is 120 Hz, each of the emission control signals EMU and EM2*j* may have a frequency of 240 Hz.

When the operating frequency is the first operating frequency, the scan signal GCCj may rise to an active level (e.g., a high level) during the first cycle C1, the scan signals GIj and GCj may rise to an active level (e.g., a high level) multiple times (e.g., twice) during each of the first and second cycles C1 and C2.

When the operating frequency is the first operating frequency, the scan signal GWj may fall to an active level (e.g., a low level) during the first cycle C1, and may be maintained at an inactive level (e.g., a high level) during the second cycle C2. That is, the first cycle C1 may be a cycle during which the data signal Di is provided, and the second cycle C2 may be a cycle during which the data signal Di is not provided.

When the scan signal GWj is at a low level during the first cycle C1, the second transistor T2 is turned on and the voltage level Vdata corresponding to the data signal Di is stored in the first capacitor Cst. Afterward, in an emission period in which the sixth and eighth transistors T6 and T8 are turned on, a current corresponding to charges stored in the capacitor Cst may be provided to the light emitting element ED.

Because the scan signal GWj is maintained at a high level during the second cycle C2, a new data signal Di is not received. In an emission period when the sixth and eighth transistors T6 and T8 during the second cycle C2 are turned on, a current corresponding to charges stored in the capacitor Cst during the first cycle C1 may be provided to the light emitting element ED.

That is, when the operating frequency is the first operating frequency, a current corresponding to the data signal Di received during the first cycle C1 may be provided to the light emitting element ED during each of the first cycle C1 and the second cycle C2.

FIG. 11 is a timing diagram of scan signals and emission control signals for describing an operation of the pixel shown in FIG. 9 when an operating frequency is a second operating frequency.

Referring to FIGS. 9 and 11, when an operating frequency is a second operating frequency, each of the first frame F1 and the second frame F2 may include the first cycle C1 and the second cycle C2. When the operating frequency is the second operating frequency, one period may include the first frame F1 and the second frame F2. The second operating frequency may be a lower frequency than the first operating frequency. In an embodiment, the first operating frequency may be 120 Hz, and the second operating frequency may be 60 Hz.

When the operating frequency is the second operating frequency, the emission control signals EM1*j* and EM2*j* may fall to an active level (e.g., a low level) during the first and second cycles C1 and C2 of each of the first frame F1 and the second frame F2. That is, one frame may include two emission periods.

When the operating frequency is the second operating frequency, the scan signal GCCj rises to an active level (e.g., a high level) during the first cycle C1 of the first frame F1 and then is maintained at an inactive level (e.g., a low level) during the second cycle C2 of the first frame F1 and the first and second cycles C1 and C2 of the second frame F2. The scan signals GIj and GCj may fall to an active level (e.g., a low level) during the first cycle C1 of the first frame F1 multiple times (e.g., 2 times). The scan signals GIj and GCj may be maintained at a low level in the second cycle C2 of the first frame F1 and the first and second cycles C1 and C2 of the second frame F2.

When the operating frequency is the second operating frequency, the scan signal GWj may fall to an active level (e.g., a low level) during the first cycle C1 of each of the first frame F1 and the second frame F2, and may be maintained at an inactive level (e.g., a high level) during the second cycle C2 of each of the first frame F1 and the second frame F2. A time during which the scan signal GWj is maintained at an active level (e.g., a low level) during the first cycle C1 of each of the first frame F1 and the second frame F2 may be variously changed within a range in which all the emission control signals EM1*j* and EM2*j* are maintained at a high level.

When the scan signal GWj is at a low level during the first cycle C1 of the first frame F1, the second transistor T2 is turned on and the voltage level Vdata corresponding to the data signal Di is stored in the first capacitor Cst. Afterward, in an emission period in which the sixth and eighth transistors T6 and T8 are turned on, a current corresponding to charges stored in the capacitor Cst may be provided to the light emitting element ED.

Because the scan signal GWj is maintained at a high level during the second cycle C2 of the first frame F1, no new data signal Di is received. In an emission period when the sixth and eighth transistors T6 and T8 during the second cycle C2 are turned on, a current corresponding to charges stored in the capacitor Cst during the first cycle C1 may be provided to the light emitting element ED.

When the scan signal GWj is a low level during the first cycle C1 of the second frame F2, the second transistor T2 may be turned on, and the bias signal Bi may be delivered to the first electrode of the first transistor T1. The bias signal Bi provided through the data line DLi may be applied to the first electrode of the first transistor T1. At this time, because the scan signal GCCj is at a low level, the ninth transistor T9 is turned off, and thus the bias signal Bi is not stored in the first capacitor Cst. In an emission period when the sixth and eighth transistors T6 and T8 during the first cycle C1 of the second frame F2 are turned on, a current corresponding to charges stored in the capacitor Cst during the first cycle C1 may be provided to the light emitting element ED.

Because the scan signal GWj is maintained at a high level during the second cycle C2 of the second frame F2, no new data signal Di is received. In an emission period when the sixth and eighth transistors T6 and T8 during the second cycle C2 of the second frame F2 are turned on, a current corresponding to charges stored in the capacitor Cst during the first cycle C1 may be provided to the light emitting element ED.

When the operating frequency is the second operating frequency, the first cycle C1 of the first frame F1 may be referred to as an "address scan cycle" during which the valid data signal Di is provided. Each of the second cycle C2 of the first frame F1, the first cycle C1 of the second frame F2, and the second cycle C2 of the second frame F2 may be referred to as a "self-scan cycle" during which the valid data signal Di is not provided.

In an embodiment, the first cycle C1 of the second frame F2 is a cycle during which the bias signal Bi is applied to the first electrode of the first transistor T1. Each of the second cycle C2 of the first frame F1 and the second cycle C2 of the second frame F2 is a cycle during which the first driving voltage ELVDD is applied to the first electrode of the first transistor T1.

The first driving voltage ELVDD and the bias signal Bi may be alternately applied to the first electrode of the first transistor T1. As a voltage applied to the first electrode of the first transistor T1 is periodically changed, a change in luminance due to hysteresis characteristics of the first transistor T1 may be minimized.

When the operating frequency is the second operating frequency (e.g., 60 Hz), a data write operation may be performed during only the first cycle C1 of the first frame F1. However, light may be emitted depending on the same data signal Di during the second cycle C2 of the first frame F1 and the first and second cycles C1 and C2 of the second frame F2. Accordingly, the same effect as the operating frequency of 240 Hz may be achieved.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

A compensation period for compensating for a threshold voltage of a first transistor and a data write period for storing a data signal in a first capacitor may be separated in a pixel of a display device having such a configuration. Accordingly, the threshold voltage compensation time of the first transistor may be sufficiently secured.

A pixel may further include a boosting capacitor to compensate for a voltage level of a signal provided to a gate electrode of the first transistor according to a change in a signal level of a scan signal. Accordingly, it is possible to minimize the distortion of an image displayed on pixels.

Furthermore, when the display device operates in a mode of a low frequency lower than a normal frequency, a first driving voltage and a bias voltage may be alternately applied to a first electrode of the first transistor. Accordingly, deterioration of image quality due to a hysteresis characteristic of the first transistor may be prevented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A pixel comprising:

a light emitting element;

a first transistor including a first electrode electrically connected to a first voltage line which supplies a first driving voltage, a second electrode and a gate electrode connected to a first node;

a second transistor connected between a data line and the first electrode of the first transistor, and including a gate electrode connected to a first scan line; and a sixth transistor connected between the second electrode of the first transistor and the light emitting element, and including a gate electrode connected to a second emission control line, wherein each of a plurality of frames includes a first cycle and a second cycle, wherein a first scan signal provided to the first scan line has an active level during a write period of the first cycle, wherein the first scan signal provided to the first scan line is maintained at an inactive level during the second cycle, and wherein one of a data signal and a bias signal is provided to the data line during the write period.

2. The pixel of claim 1, further comprising:

a third transistor connected between the second electrode of the first transistor and the first node, and including a gate electrode connected to a second scan line;

a fourth transistor connected between the first node and a first initialization voltage line, and including a gate electrode connected to a third scan line;

a ninth transistor connected between the first electrode of the first transistor and a second node, and including a gate electrode connected to a fourth scan line; and a first capacitor connected between the first node and the second node.

3. The pixel of claim 2, wherein each of the first transistor, the second transistor, and the sixth transistor is a P-type transistor, and each of the third transistor, the fourth transistor and the ninth transistor is an N-type transistor.

4. The pixel of claim 2, further comprising:

a seventh transistor connected between the light emitting element and a second initialization voltage line, and including a gate electrode connected to the first scan line;

an eighth transistor connected between the first voltage line and the first electrode of the first transistor, and including a gate electrode connected to a first emission control line; and a second capacitor connected between the first voltage line and the second node.

5. The pixel of claim 4, wherein a second emission control signal provided to the second emission control line has inactive level during the write period of the first cycle, and wherein a first emission control signal provided to the first emission control line has inactive level during the write period of the first cycle.

6. The pixel of claim 4, wherein a second scan signal, a third scan signal and a fourth scan signal are provided to the second scan line, the third scan line and the fourth scan line, respectively, and wherein each of the second scan signal, the third scan signal and the fourth scan signal has the inactive level during the write period of the first cycle.

7. A display device comprising:

a display panel including a pixel;

a driving controller which receives a control signal and an input image signal and outputs an output image signal, a first control signal, and a second control signal;

a data driving circuit which outputs a data signal to the pixel in response to the output image signal and the first control signal; and a scan driving circuit which outputs a first scan signal to the pixel in response to the second control signal, wherein the pixel includes:

a light emitting element;

a first transistor including a first electrode electrically connected to a first voltage line which supplies a first driving voltage, a second electrode and a gate electrode connected to a first node;

a second transistor connected between a data line and the first electrode of the first transistor, and including a gate electrode connected to a first scan line; and a sixth transistor connected between the second electrode of the first transistor and the light emitting element, and including a gate electrode connected to a second emission control line, wherein each of a plurality of frames includes a first cycle and a second cycle, wherein the first scan signal provided to the first scan line has an active level during a write period of the first cycle, wherein the first scan signal provided to the first scan line is maintained at an inactive level during the second cycle, and wherein one of a data signal and a bias signal is provided to the data line during the write period.

8. The display device of claim 7, the pixel further includes:

a third transistor connected between the second electrode of the first transistor and the first node, and including a gate electrode connected to a second scan line;

a fourth transistor connected between the first node and a first initialization voltage line, and including a gate electrode connected to a third scan line;

a ninth transistor connected between the first electrode of the first transistor and a second node, and including a gate electrode connected to a fourth scan line; and a first capacitor connected between the first node and the second node.

9. The display device of claim 8, wherein each of the first transistor, the second transistor, and the sixth transistor is a P-type transistor, and each of the third transistor, the fourth transistor and the ninth transistor is an N-type transistor.

10. The display device of claim 8, the pixel further includes:

a seventh transistor connected between the light emitting element and a second initialization voltage line, and including a gate electrode connected to the first scan line;

an eighth transistor connected between the first voltage line and the first electrode of the first transistor, and including a gate electrode connected to a first emission control line; and a second capacitor connected between the first voltage line and the second node.

11. The display device of claim 10, wherein a second emission control signal provided to the second emission control line has inactive level during the write period of the first cycle, and wherein a first emission control signal provided to the first emission control line has inactive level during the write period of the first cycle.

12. The display device of claim 11, wherein the scan driving circuit further outputs a second scan signal, a third scan signal and a fourth scan signal in response to the second control signal, wherein the second scan signal, the third scan signal and the fourth scan signal are provided to the second scan line, the third scan line and the fourth scan line, respectively, and wherein each of the second scan signal, the third scan signal and the fourth scan signal has the inactive level during the write period of the first cycle.

13. A pixel comprising:

a light emitting element;

a first transistor including a first electrode electrically connected to a first voltage line which supplies a first driving voltage, a second electrode and a gate electrode connected to a first node;

a second transistor connected between a data line and the first electrode of the first transistor, and including a gate electrode connected to a first scan line; and a sixth transistor connected between the second electrode of the first transistor and the light emitting element, and including a gate electrode connected to a second emission control line, wherein each of a first frame and a second frame includes a first cycle and a second cycle, wherein a first scan signal provided to the first scan line has an active level during a data write period of the first cycle of the first frame and a bias period of the first cycle of the second frame, wherein the first scan signal provided to the first scan line is maintained at an inactive level during the second cycle of the first frame and the second cycle of the second frame, and wherein a data signal is provided to the data line during the data write period and a bias signal is provided to the data line during the bias period.

14. The pixel of claim 13, further comprising:

a third transistor connected between the second electrode of the first transistor and the first node, and including a gate electrode connected to a second scan line;

a fourth transistor connected between the first node and a first initialization voltage line, and including a gate electrode connected to a third scan line;

a ninth transistor connected between the first electrode of the first transistor and a second node, and including a gate electrode connected to a fourth scan line; and a first capacitor connected between the first node and the second node.

15. The pixel of claim 14, wherein each of the first transistor, the second transistor, and the sixth transistor is a P-type transistor, and each of the third transistor, the fourth transistor and the ninth transistor is an N-type transistor.

16. The pixel of claim 14, further comprising:

a seventh transistor connected between the light emitting element and a second initialization voltage line, and including a gate electrode connected to the first scan line;

an eighth transistor connected between the first voltage line and the first electrode of the first transistor, and including a gate electrode connected to a first emission control line; and a second capacitor connected between the first voltage line and the second node.

17. The pixel of claim 16, wherein a second emission control signal provided to the second emission control line has inactive level during the data write period of the first cycle of the first frame and the bias period of the first cycle of the second frame, and wherein a first emission control signal provided to the first emission control line has inactive level during the data write period of the first cycle of the first frame and the bias period of the first cycle of the second frame.

18. The pixel of claim 16, wherein a second scan signal, a third scan signal and a fourth scan signal are provided to the second scan line, the third scan line and the fourth scan line, respectively, wherein each of the second scan signal, the third scan signal and the fourth scan signal has the inactive level during the second cycle of the first frame, and wherein each of the second scan signal, the third scan signal and the fourth scan signal has the inactive level during the second frame.

* * * * *